US009652598B2

United States Patent
Okada et al.

(10) Patent No.: US 9,652,598 B2
(45) Date of Patent: May 16, 2017

(54) INFORMATION PROCESSING DEVICE, CONTROL METHOD, AND STORAGE MEDIUM

(71) Applicant: Sony Corporation, Tokyo (JP)

(72) Inventors: Sumio Okada, Saitama (JP); Hiroshi Nakayama, Chiba (JP); Ryota Sakamoto, Tokyo (JP); Chika Miura, Tokyo (JP); Tsutomu Kawachi, Tokyo (JP); Masayuki Chatani, Tokyo (JP); Eiji Miyakawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 10 days.

(21) Appl. No.: 14/625,141

(22) Filed: Feb. 18, 2015

(65) Prior Publication Data

US 2015/0242596 A1  Aug. 27, 2015

(30) Foreign Application Priority Data

Feb. 21, 2014  (JP) .................................. 2014-031591

(51) Int. Cl.
*H04L 29/06* (2006.01)
*G06F 21/10* (2013.01)
*H04L 29/08* (2006.01)

(52) U.S. Cl.
CPC .............. *G06F 21/10* (2013.01); *H04L 67/10* (2013.01); *G06F 2221/0724* (2013.01)

(58) Field of Classification Search
CPC ...................................................... G06F 21/10
USPC .......................................................... 726/26
See application file for complete search history.

(56) References Cited

U.S. PATENT DOCUMENTS

| 5,629,980 | A  | * | 5/1997 | Stefik | G06F 21/10 |
| | | | | | 705/54 |
| 7,395,245 | B2 | * | 7/2008 | Okamoto | G06F 21/10 |
| | | | | | 705/51 |
| 2002/0056003 | A1 | * | 5/2002 | Goswami | G06F 9/54 |
| | | | | | 709/227 |
| 2003/0028454 | A1 | * | 2/2003 | Ooho | G06Q 10/0631 |
| | | | | | 705/32 |
| 2011/0125731 | A1 | * | 5/2011 | Isozu | G06F 17/30265 |
| | | | | | 707/722 |
| 2011/0320380 | A1 | * | 12/2011 | Zahn | G06Q 30/0282 |
| | | | | | 705/347 |
| 2012/0078845 | A1 | * | 3/2012 | Kasbekar | G06Q 10/107 |
| | | | | | 707/640 |

FOREIGN PATENT DOCUMENTS

JP    2007-274557    10/2007

* cited by examiner

*Primary Examiner* — Longbit Chai
(74) *Attorney, Agent, or Firm* — Oblon, McClelland, Maier & Neustadt, L.L.P.

(57) ABSTRACT

There is provided an information processing device including a communication unit configured to receive editing information of content data, an accumulation unit configured to accumulate the editing information, and a control unit configured to control whether to return the editing information to an external device in accordance with a right to use content corresponding to a requestor's identification information included in request information for requesting the editing information, the request information being received from the external device via the communication unit.

17 Claims, 20 Drawing Sheets

INFORMATION PROCESSING DEVICE, CONTROL METHOD, AND STORAGE MEDIUM

CROSS REFERENCE TO RELATED APPLICATIONS

This application claims the benefit of Japanese Priority Patent Application JP 2014-031591 filed Feb. 21, 2014, the entire contents of which are incorporated herein by reference.

BACKGROUND

The present disclosure relates to an information processing device, a control method, and a storage medium.

Recently, a technology for sharing and utilizing recording/editing information via a network or a storage medium has been proposed. For example, JP 2007-274557A discloses an editing information sharing system that transmits process information (editing information and message) edited by a recording and reproducing device to another recording and reproducing device via a network, and causes the plurality of recording and reproducing devices to share editing function information.

SUMMARY

However, the above-described editing information sharing system does not determine whether a user of editing information owns a right to use content to be edited when the editing information is shared. The right to use content for reproducing or personally editing the content may be acquired by a user duly purchasing the content via a network or via a storage medium, or by a user duly renting the content. Accordingly, if presence or absence of such right to use can be confirmed when editing information is provided, the right to use the content can be managed while the editing information is shared. That is, convenience of the editing information sharing system is further improved.

Accordingly, the present disclosure proposes an information processing device, control method, and storage medium capable of control transmission of editing information in accordance with presence or absence of a right to use content to be edited.

According to an embodiment of the present disclosure, there is provided an information processing device including a communication unit configured to receive editing information of content data, an accumulation unit configured to accumulate the editing information, and a control unit configured to control whether to return the editing information to an external device in accordance with a right to use content corresponding to a requestor's identification information included in request information for requesting the editing information, the request information being received from the external device via the communication unit.

According to another embodiment of the present disclosure, there is provided an information processing device including a communication unit configured to transmit request information for requesting editing information corresponding to specific content data to a server device, a storage unit configured to store a right to use content data, and a control unit configured to perform control in a manner that content data referred to by the editing information corresponding to the request information received via the communication unit is reproduced by using the editing information, in accordance with whether the storage unit stores the right to use the content data.

According to another embodiment of the present disclosure, there is provided a control method including receiving editing information of content data, accumulating the editing information, and controlling whether to return the editing information to an external device in accordance with a right to use content corresponding to a requestor's identification information included in request information for requesting the editing information, the request information being received from the external device.

According to another embodiment of the present disclosure, there is provided a non-transitory computer-readable storage medium having a program stored therein, the program causing a computer to function as a communication unit configured to transmit request information for requesting editing information corresponding to specific content data to a server device, a storage unit configured to store a right to use content data, and a control unit configured to perform control in a manner that content data referred to by the editing information corresponding to the request information received via the communication unit is reproduced by using the editing information, in accordance with whether the storage unit stores the right to use the content data.

According to one or more of embodiments of the present disclosure as described above, it is possible to control transmission of editing information in accordance with presence or absence of a right to use content to be edited.

Note that the present disclosure is not limited to the effect stated above and in addition to or in place of the effect stated above, may achieve any of the effects indicated in this specification or effects that can be understood from the specification.

DETAILED DESCRIPTION OF THE EMBODIMENT(S)

Figure 1:
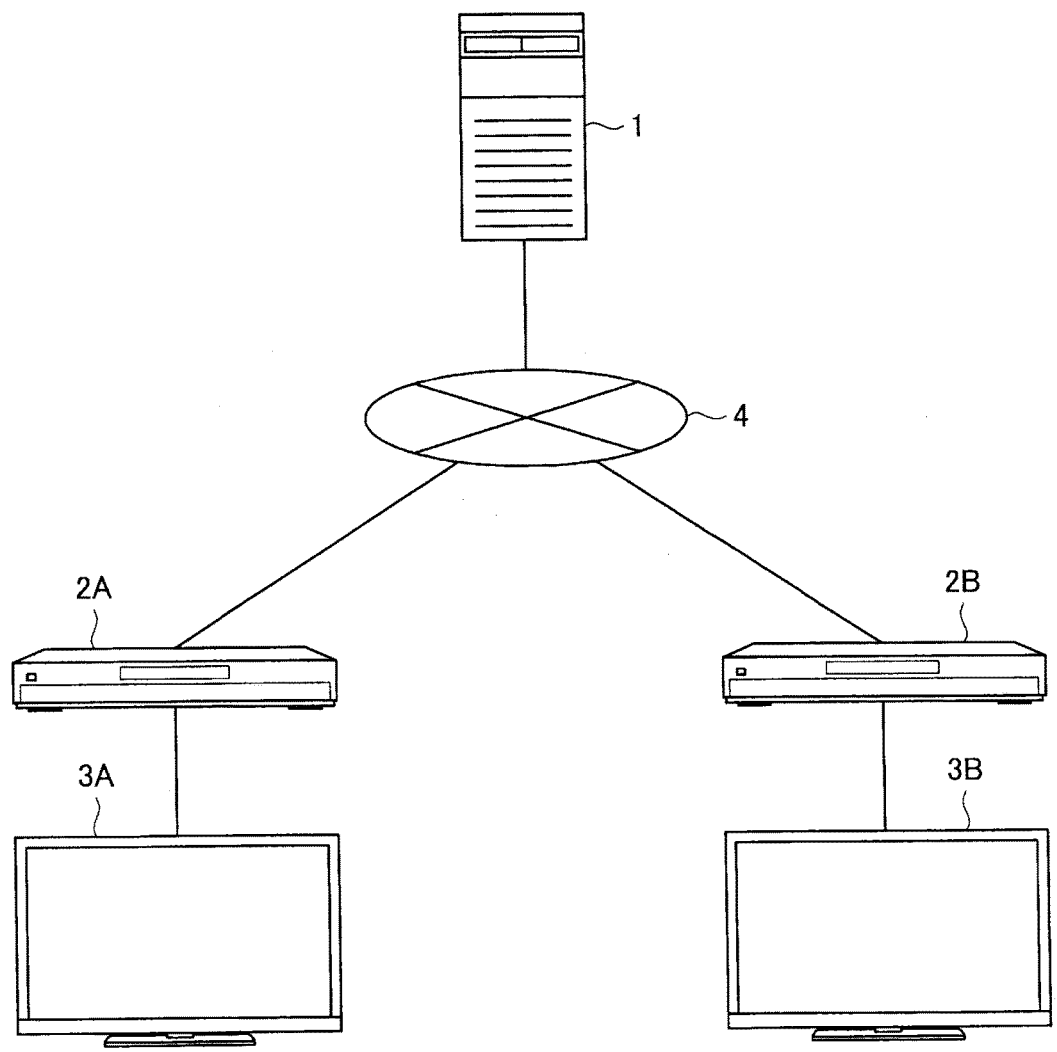
FIG. 1 is a diagram illustrating an overview of an editing information sharing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. Overview of Editing Information Sharing System According to Embodiment of Present Disclosure
2. Embodiments
2-1. First Embodiment
2-1-1. Configurations
2-1-2. Operation Process
2-1-3. Modification
2-2. Second Embodiment
2-3. Third Embodiment
2-4. Fourth Embodiment
2-5. Fifth Embodiment
2-6. Sixth Embodiment
2-7. Seventh Embodiment
2-8. Eighth Embodiment
3. Conclusion <<1. Overview of Editing Information Sharing System According to Embodiment of Present Disclosure>>

First, with reference to FIG. 1, an overview of an editing information sharing system according to an embodiment of the present disclosure is explained.

As shown in FIG. 1, a recording and reproducing device 2A on an editing information provider side, a recording and reproducing device 2B on a editing information user side, and an editing information sharing server 1 are connected via a network 4 in the editing information sharing system according to the present embodiment.

For example, the recording and reproducing devices 2A and 2B are connected with display devices 3A and 3B, respectively. The display devices 3A and 3B reproduce content on which editing process has been performed on the basis of editing information.

A user of the recording and reproducing device 2A can edit content by using the recording and reproducing device 2A, combining a single piece or pieces of content stored by video recording, and perform operation such as partial reproduction, insertion of a title or caption, or addition of a second audio program channel. Editing information of the content formed in such a way is stored in the recording and reproducing device 2A, and is uploaded to the editing information sharing server 1. Accordingly, the editing information can be shared by another user.

The editing information sharing server 1 stores the uploaded editing information and causes the editing information to be able to be viewed and downloaded from the another recording and reproducing device 2B.

A user of the recording and reproducing device 2B downloads desired editing information to the recording and reproducing device 2B from among editing information stored in the editing information sharing server 1. Subsequently, the recording and reproducing device 2B edits content owned by the recording and reproducing device 2B itself on the basis of the desired editing information, and reproduces the edited content.

In this way, the recording and reproducing device 2B can reproduce remixed content edited by the recording and reproducing device 2A by exchanging editing information that does not include substance of authority-limited content while the authority-limited content is not uploaded and downloaded.

(Background)

Here, in the related arts, it is not confirmed whether the user of the recording and reproducing device 2B (user of editing information) owns a right to use content to be edited, and management of the right to use the content is not considered.

According to the present embodiment, convenience of the editing information sharing system is further improved by controlling transmission of editing information in accordance with presence or absence of a right to use content to be edited, sharing the editing information, and managing the right to use the content.

In addition, by using the editing information sharing system according to the present embodiment, the user of editing information can also view content that has been edited by another person and that could not have been made by the user, in addition to view original content. Accordingly, ways that the user enjoys content have increased.

Alternatively, for the content provider, opportunities of selling content necessary to reproduce remixed content based on the editing information arise, and the content provider can make a good profit.

In addition, a provider of the editing information sharing server (provider of editing information sharing service) can make a good profit by inserting an advertisement in remixed content reproduced on the basis of editing information, obtaining a commission on sales of editing information or content, or the like.

The overview of the editing information sharing system according to an embodiment of the present disclosure has been explained. Next, the editing information sharing systems according to a plurality of embodiments of the present disclosure are explained specifically. Note that, in the example shown in FIG. 1, the recording and reproducing devices 2 on the editing information provider user side and on the editing information user side are implemented by digital recorders. However, embodiments of the present disclosure are not limited thereto. For example, the recording and reproducing device 2 may be an audio device, home video game console, mobile phone, or smartphone.

<<2. Embodiments>>
<2-1. First Embodiment>

Figure 2:
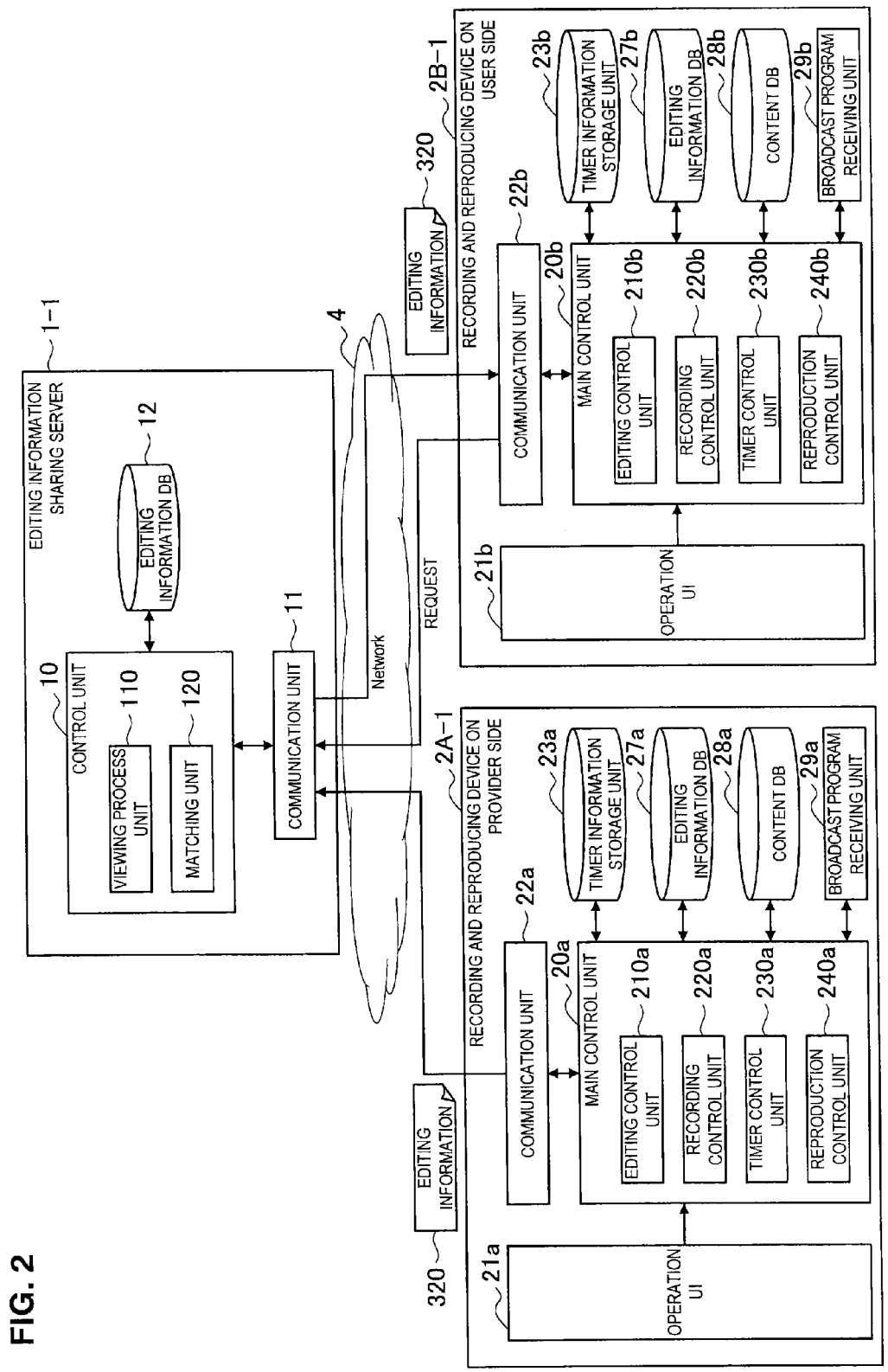
FIG. 2 is a block diagram showing respective configurations of an editing information sharing system according to a first embodiment.
Figure 3:
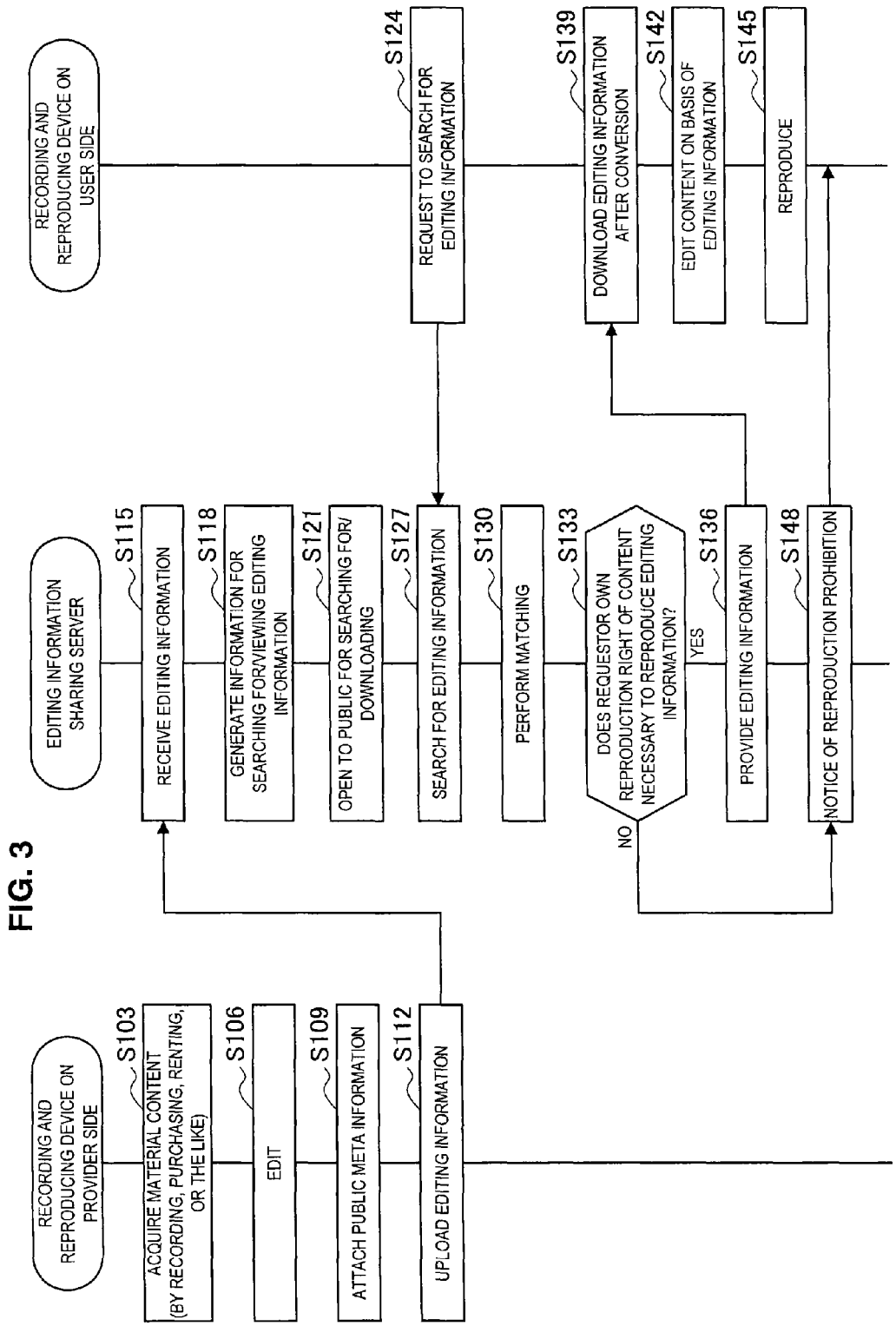
FIG. 3 is a sequence diagram showing an operation process in an editing information sharing system according to the first embodiment.

First, with reference to FIGS. 2 to 3, an editing information sharing system according to the first embodiment is explained.

(2-1-1. Configuration)

FIG. 2 is a block diagram showing configurations of an editing information sharing system according to the first embodiment. As shown in FIG. 2, the editing information sharing system according to the present embodiment includes a recording and reproducing device 2A-1 on an editing information provider side, an editing information sharing server 1-1, and a recording and reproducing device 2B-1 on an editing information user side.

(Recording and Reproducing Device on Provider Side)

As shown in FIG. 2, the recording and reproducing device 2A-1 on the provider side includes a main control unit 20a, an operation user interface (UI) 21a, a communication unit 22a, a timer information storage unit 23a, an editing information DB 27a, a content DB 28a, and a broadcast program receiving unit 29a.

The main control unit 20a is implemented by a microcontroller including a central processing unit (CPU), read only memory (ROM), random access memory (RAM), non-volatile memory, and an interface unit, for example. The main control unit 20a controls respective configurations of the recording and reproducing device 2A on the provider side. In addition, as shown in FIG. 2, the main control unit 20a functions as an editing control unit 210a, a recording control unit 220a, a timer control unit 230a, and a reproduction control unit 240a.

In response to an editing operation input by a user via the operation UI 21a, the editing control unit 210a edits a single piece or pieces of content, and outputs editing information 320. Examples of details of editing include partial reproduction of pieces of content, insertion of a title or a caption, or addition of a second audio program channel or subtitles. The editing control unit 210a extracts content to be edited from the content DB 28a, and stores the formed content after editing in the content DB 28a. In addition, the editing control unit 210a stores editing information 320 that does not include substance of the content after editing in the editing information DB 27a.

Here, an example of data configuration of the editing information 320 is explained. The editing information 320 includes information on target content as "source content information". For example, in a case where source content is a broadcast program, the information on target content is program identifying information. Alternatively, in a case where the source content is commercially available content, the information on target content is title information, for example. In addition, the editing information 320 includes information on details of editing as "content editing information". Examples of the information on details of editing include content identifying information, a reproduction start/stop position (timecode), a reproduction condition, a caption, BGM information, and effect information. Note that, "editing information catalog" indicating an overview of the editing information may be attached to the editing information. Examples of the "editing information catalog" include a title of the editing information, a type of the editing information, and a thumbnail of the editing information, reproduction time, and a list of dependent content. The editing control unit 210a can generate the editing information catalog. In addition, the user can input a title of the editing information using the operation UI 21a.

The recording control unit 220a performs data conversion, an encoding/decoding process or the like on program content (broadcast program) received by the broadcast program receiving unit 29a, so as to cause the content DB 28a to store (record) program content data. In addition, the recording control unit 220a performs a recording process in response to a recording operation input by the user via the operation UI 21a, or in response to control performed by the timer control unit 230a.

The timer control unit 230a is a functional unit for registering timer information of a recording process performed by the recording control unit 220a. The timer control unit 230a receives information on timer recording input by the user via the operation UI 21a, and stores the information in the timer information storage unit 23a. In the timer information storage unit 23a, timer recording information is stored by the timer control unit 230a. For example, in the timer information storage unit 23, a channel number, recording start/stop time, and a program name are recorded. In addition, in accordance with the information stored in the timer information storage unit 23a, the timer control unit 230a controls the recording control unit 220a in a manner that a predetermined broadcast program is recorded.

The reproduction control unit 240a performs control in a manner that the display device 3A (see FIG. 1) reproduces program content stored in the content DB 28a. Alternatively, the reproduction control unit 240a may perform control in a manner that program content received by the broadcast program receiving unit 29a is reproduced in real time.

The operation user interface (UI) 21a is an operation input unit for receiving a user operation. For example, the operation UI 21a may be a controller receiving unit for receiving input information transmitted from a controller used by the user.

The communication unit 22a connects with an external device and transmits/receives data. For example, the communication unit 22a transmits the editing information 320 to the editing information sharing server 1-1 via the network 4.

The content DB 28a is configured of a hard disk, mainly. The content DB 28a is a storage unit for storing program content and the like received by the broadcast program receiving unit 29a.

The broadcast program receiving unit 29a receives program content of TV programs broadcasted by broadcast stations via a receiving antenna or an IP network for video delivery.

(Editing Information Sharing Server)

As shown in FIG. 2, an editing information sharing server 1-1 includes a control unit 10, a communication unit 11, and an editing information DB 12.

The control unit 10 controls respective configurations of the editing information sharing server 1-1. For example, the control unit 10 causes the editing information DB 12 to store the editing information 320 received from the recording and reproducing device 2A on the provider side via the communication unit 11. In addition, the control unit 10 according to the present embodiment functions as a viewing process unit 110 and a matching unit 120.

The viewing process unit 110 has a function to search for editing information in response to a request from another device and allow the another device to view the searched editing information. In addition, the viewing process unit 110 may generate, as an editing information catalog, information for searching and viewing on the basis of the editing information 320. In a case where an editing information catalog has already been attached to the editing information 320, the viewing process unit 110 may refer to the editing information catalog and automatically generate a lacking item in the editing information catalog.

In a case of receiving an editing information transmission request from the recording and reproducing device 2B-1 on the user side, the matching unit 120 determines whether to return the editing information 320 in accordance with a right to use content corresponding to identification information of a requestor (user or recording and reproducing device 2B-1). Specifically, the matching unit 120 determines whether the user or the recording and reproducing device 2B-1 that are serving as the requestor owns the right to use content necessary to use the requested editing information (right to use content to be edited). In a case where the user or the recording and reproducing device 2B-1 owns the right, the matching unit 120 returns corresponding editing information 320. As described above, according to the present embodiment, management of the right to use content can also be performed when the editing information 320 is shared with another device.

The communication unit 11 communicates with an external device and transmits/receives data. For example, the communication unit 11 receives the editing information 320 from the recording and reproducing device 2A on the provider side, and transmits the editing information 320 in response to a request from the recording and reproducing device 2B on the user side. Note that, an editing information catalog may be attached to the editing information 320 to be transmitted to the recording and reproducing device 2B on the user side.

(Recording and Reproducing Device on User Side)

The recording and reproducing device 2B-1 on the user side includes an operation UI 21*b*, a main control unit 20*b*, a communication unit 22*b*, a timer information storage unit 23*b*, an editing information DB 27*b*, a content DB 28*b*, and a broadcast program receiving unit 29*b*. That is, the recording and reproducing device 2B-1 on the user side has a similar configuration as the recording and reproducing device 2A on the provider side. Accordingly, the recording and reproducing device 2A on the provider side and the recording and reproducing device 2B on the user side according to the present embodiment are achieved by recording and reproducing devices having configurations similar to each other. Each recording and reproducing device functions both as the device on the editing information provider side and the device on the editing information user side.

In a case where the recording and reproducing device is functions as the device on the editing information user side, the main control unit 20*b* requests editing information from the editing information sharing server 1-1, and stores the editing information 320 received from the editing information sharing server 1-1 in the editing information DB 27*b*. A reproduction control unit 240*b* performs control in a manner that content necessary to reproduce of the received editing information 320 is extracted from the content DB 28*b*, an editing process is performed on the basis of the editing information 320, and the received editing information 320 is reproduced. As described above, according to the present embodiment, content on which the editing process has been performed in a way similar to content on which the editing process has been performed by the provider side can be reproduced by the user side, while substance of the content is not transmitted/received.

Respective configurations according to the first embodiment have been explained in detail. Next, with reference to FIG. 3, an operation process according to the present embodiment is explained.

(2-1-2. Operation Process)

FIG. 3 is a sequence diagram showing an operation process in the editing information sharing system according to the first embodiment. As shown in FIG. 3, first, in Step S103, the recording and reproducing device 2A-1 on the provider side acquires material content by recording a broadcast program, purchasing or renting commercially available content. Note that, a right to use the content is also acquired when the content is duly acquired in such a way. The acquired material content is stored in the content DB 28*a*.

Next, in Step S106, the editing control unit 210*a* performs an editing process on the predetermined content stored in the content DB 28*a*, in response to an editing operation performed by a user.

Subsequently, in Step S109, the editing control unit 210*a* attaches public meta information to editing information indicating details of editing to be performed on the content. The public meta information is a list or the like of a title or a kind of the editing information and content on which the editing information depends, for example. In the present embodiment, the public meta information is also referred to as an editing information catalog. Such public meta information may be input by a user manually, or may be generated by the editing control unit 210*a* automatically.

Next, in Step S112, the recording and reproducing device 2A on the provider side transmits (uploads) the editing information to the editing information sharing server 1-1 via the communication unit 22*a*.

Subsequently, in Step S115, the editing information sharing server 1-1 receives the editing information via the communication unit 11. The received editing information is stored in the editing information DB 12.

Next, in Step S118, the viewing process unit 110 generates information for searching for/viewing editing information. The information for searching for/viewing editing information is a keyword for search purpose or a thumbnail to be viewed, for example. The information for searching for/viewing editing information is generated by being extracted from target editing information. The generated information for searching for/viewing editing information is included in the editing information catalog attached to the editing information. Alternatively, the information for searching for/viewing editing information may be generated on the basis of public meta information attached to editing information on the provider side.

Subsequently, in Step S121, the viewing process unit 110 opens the editing information to the public for searching for/downloading the editing information. Accordingly, a user of another recording and reproducing device can access to the editing information sharing server 1-1 and view information to be viewed such as a title of editing information. Accordingly, the user of the another recording and reproducing device can refer to the title or a dependent content list and select editing information that the user wants to use.

Next, in Step S124, the recording and reproducing device 2B on the user side requests desired editing information among pieces of public editing information from the editing information sharing server 1-1.

Subsequently, in Step S127, the control unit 10 in the editing information sharing server 1-1 searches the editing information DB 12 for target editing information in accordance with the request from the recording and reproducing device 2B on the user side.

Next, in Step S130, the matching unit 120 determines whether the requestor owns a right to use content (dependent content) necessary to reproduce editing information that is a target of the request (also referred to as a reproduction right to reproduce and use content, especially in the present embodiment). Specifically, for example, the matching unit 120 acquires, from a reproduction right management server (not shown), information on a reproduction right of content associated with a user or the recording and reproducing device 2B on the user side that are serving as the requestor. Subsequently, the matching unit 120 refers to the information.

Subsequently, in a case where the requestor owns the reproduction right of the content necessary to reproduce the editing information as a result of the determination performed by the matching unit 120 (YES in Step S133), the control unit 10 transmits the target editing information to the recording and reproducing device 2B on the user side in Step S136. As described above, according to the present embodiment, it is possible to share editing information and manage a reproduction right of content by controlling transmission of the editing information in accordance with presence or absence of the reproduction right of the content.

Next, in Step S139, the recording and reproducing device 2B-1 on the user side receives (downloads) the editing information from the editing information sharing server 1-1 via the communication unit 22b.

Subsequently, in Step S142, the reproduction control unit 240b of the recording and reproducing device 2B-1 on the user side edits the content on the basis of the received editing information. In Step S145, the content is reproduced by a various output device such as the display device 3B. In an appropriate case, Step S142 and Step S145 are performed in parallel. As described above, according to the present embodiment, content on which the editing process has been perform in a way similar to content on which the editing process has been performed by the provider side can be reproduced by the user side, while substance of the content is not transmitted/received.

On the other hand, in a case where the requestor does not own the reproduction right of the content necessary to reproduce the editing information as a result of the determination performed by the matching unit 120 (NO in Step S133), the editing information sharing server 1-1 returns reproduction prohibition in response to the request from the recording and reproducing device 2B-1 on the user side in Step S148. In this case, for example, the recording and reproducing device 2B-1 on the user side may purchase the lacking right to reproduce the content from the reproduction right management server (not shown) so as to duly acquire the content, and may send a request to acquire the editing information again to the editing information sharing server 1-1.

(2-1-3. Modification)

According to the first embodiment, the editing information sharing server 1-1 confirms that there is the right to reproduce the content (performs matching). However, the editing information sharing system according to embodiments of the present disclosure is not limited thereto. That is, the recording and reproducing device 2B-1 on the user side may confirm that there is the right to reproduce the content (performs matching). Hereinafter, with reference to FIGS. 4 and 5, a modification of the first embodiment is explained.

(Configuration)

Figure 4:
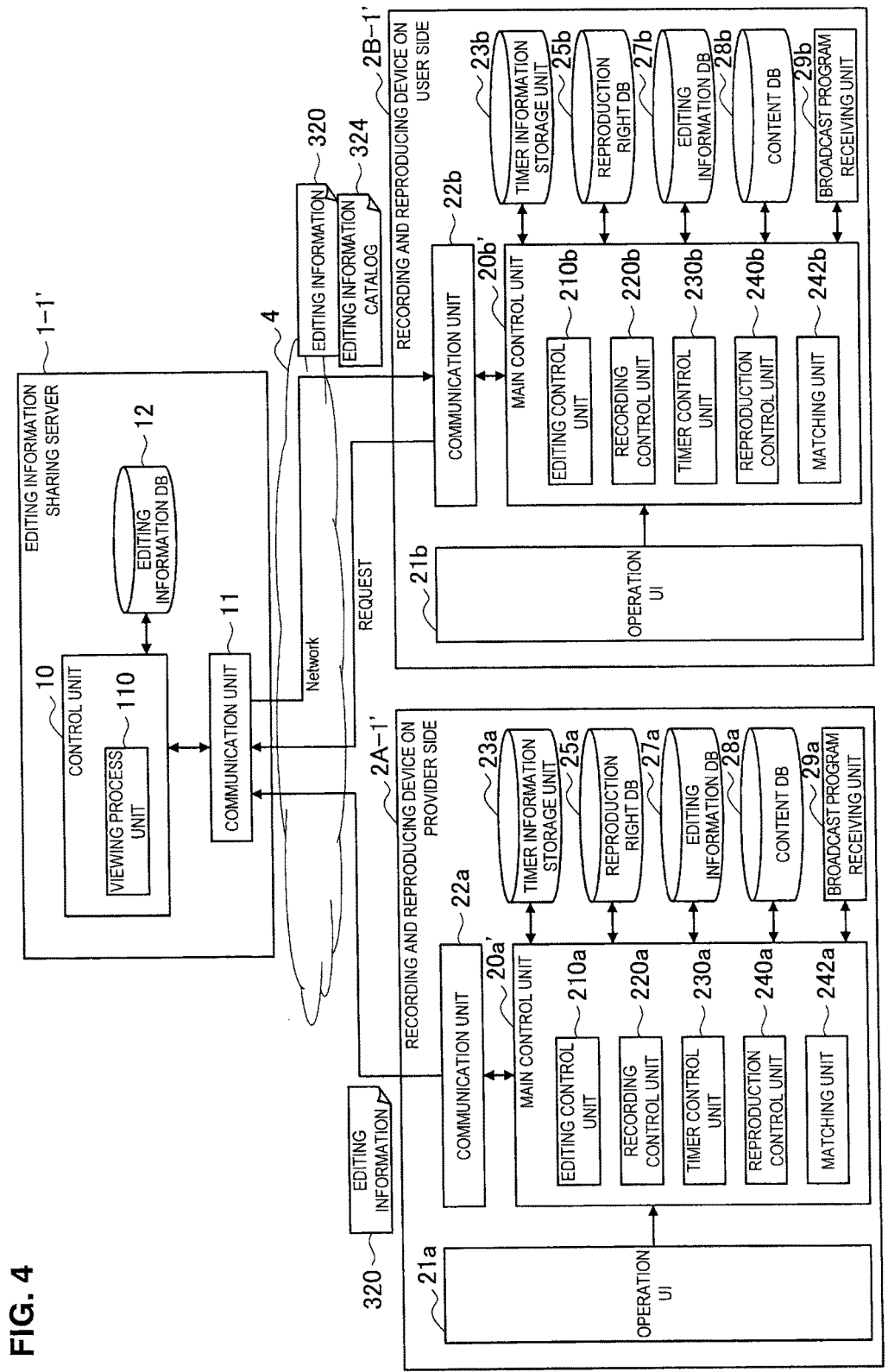
FIG. 4 is a block diagram showing respective configurations of an editing information sharing system according to a modification of the first embodiment.

FIG. 4 is a block diagram showing respective configurations of an editing information sharing system according to a modification of the first embodiment. As shown in FIG. 4, a recording and reproducing device 2A-1' on a provider side, an recording and reproducing device 2B-1' on a user side, and an editing information sharing server 1-1' are connected via a network 4 in the editing information sharing system according to the present modification. The configurations of the recording and reproducing device 2A-1' on the provider side and the recording and reproducing device 2B-1' on the user side are different from configurations of the recording and reproducing device 2A-1 on the provider side and the recording and reproducing device 2B-1 on the user side that have been explained with reference to FIG. 2 in the first embodiment, in that configurations of the recording and reproducing device 2A-1' on the provider side and the recording and reproducing device 2B-1' on the user side further include matching units 242a and 242b and reproduction right DBs 25a and 25b, respectively. In addition, the configuration of the editing information sharing server 1-1' is different from the configuration of the editing information sharing server 1-1 according to the first embodiment, in that the editing information sharing server 1-1' does not include the matching unit 120.

The matching unit 242b of the recording and reproducing device 2B-1' on the user side refers to an editing information catalog 324 attached to editing information 320 received from the editing information sharing server 1-1' via a communication unit 22b. Subsequently, the matching unit 242b determines whether a reproduction right of content necessary to reproduce the editing information 320 is stored in the reproduction right DB 25b.

Next, in response to a result of the determination performed by the matching unit 242b, the reproduction control unit 240b controls reproduction of the content edited based on the editing information 320. In a case where the matching unit 242b determines that the reproduction right DB 25b stores the reproduction right of content on which the editing information 320 depends (to which the editing information 320 refers), the reproduction control unit 240b performs control in a manner that the content is edited and reproduced on the basis of the editing information 320. On the other hand, in a case where it is determined that the reproduction right of the content is not stored, the reproduction control unit 240b prohibits reproduction of the content based on the editing information 320.

The difference between the configurations of the present modification and the configurations of the first embodiment has been explained in detail. Next, with reference to FIG. 5, an operation process according to the present modification is explained.

(Operation Process)

Figure 5:
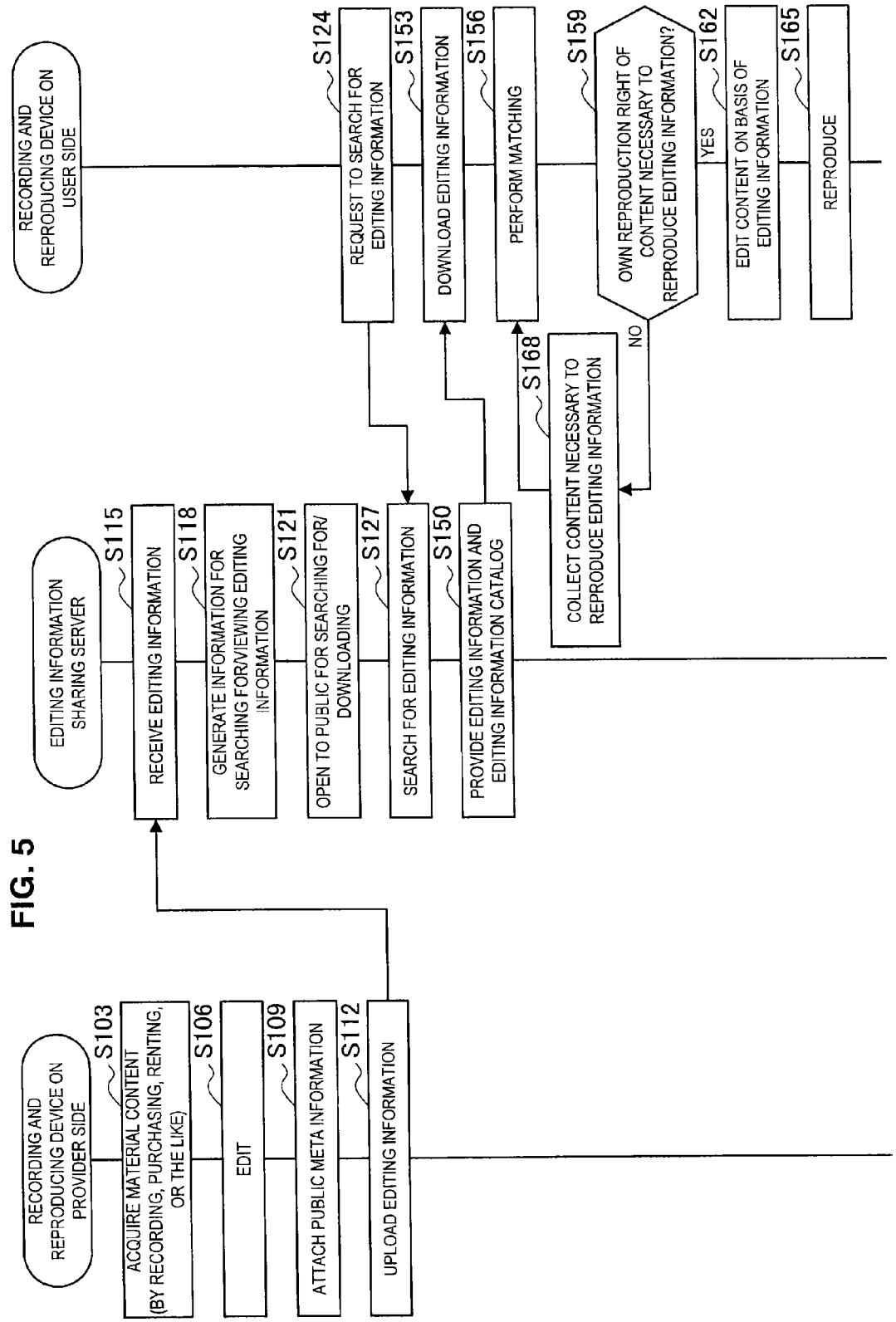
FIG. 5 is a sequence diagram showing an operation process in an editing information sharing system according to a modification of the first embodiment.

FIG. 5 is a sequence diagram showing an operation process in the editing information sharing system according to the modification of the first embodiment. Processes in Steps S103 to S127 shown in FIG. 5 are similar to the processes in the same steps explained with reference to FIG. 3. Accordingly, repeated explanation is omitted.

Subsequently, in Step S150, the editing information sharing server 1-1' returns the editing information searched in accordance with the request from the recording and reproducing device 2B-1' on the user side, and the editing information catalog attached thereto.

Next, in Step S153, the recording and reproducing device 2B-1' on the user side receives (downloads) the editing information from the editing information sharing server 1-1' via the communication unit 22b.

Subsequently, in Step S156, the matching unit 242b of the recording and reproducing device 2B-1' on the user side determines (performs matching) whether the reproduction right DB 25b stores a reproduction right of content necessary to reproduce the received editing information.

Subsequently, in a case where the reproduction right of the content necessary to reproduce the editing information is stored as a result of the determination performed by the matching unit 242b (YES in Step S159), the reproduction control unit 240b edits the content on the basis of the received editing information in Step S162, and the edited content is reproduced by the display device 3B or the like in Step S165.

On the other hand, in a case where the reproduction right of the content necessary to reproduce the editing information is not stored as a result of the determination performed by the matching unit 242b (NO in Step S159), the main control unit 20b collects the content necessary to reproduce the editing information in Step S168. Specifically, for example, the main control unit 20b may purchase the lacking reproduction right of the content from the reproduction right management server (not shown) or may purchase commercially available content so as to duly acquire (collect) the content. Subsequently, the matching unit 242b performs determination again. Note that, the reproduction right may be purchased after it is confirmed that the user has an intention of purchase.

As explained above, in the editing information sharing system according to an embodiment of the present disclosure, it is possible for the recording and reproducing device 2B-1' on the user side to determine presence or absence of a reproduction right of content necessary to reproduce content based on editing information.

<2-2. Second Embodiment>

Figure 6:
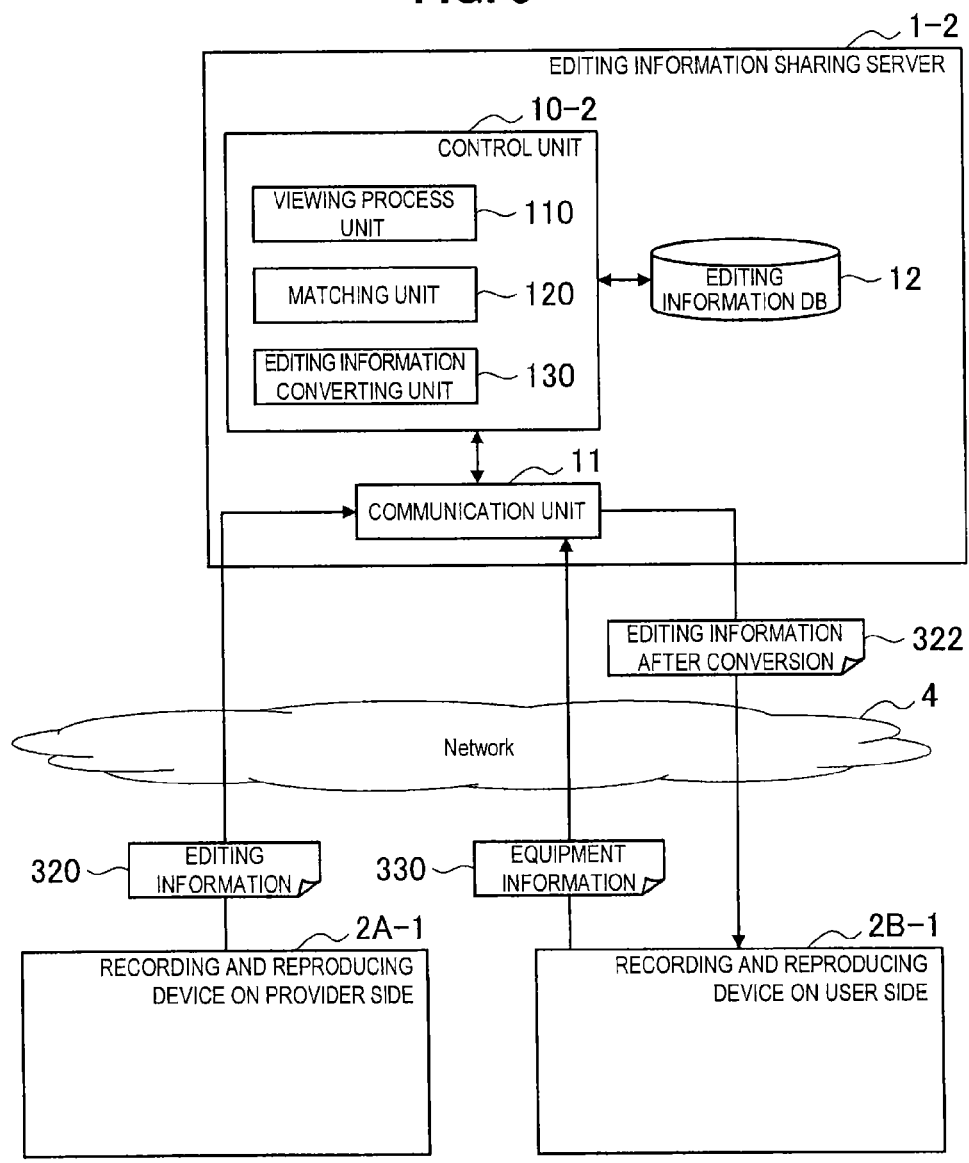
FIG. 6 is a block diagram showing respective configurations of an editing information sharing system according to a second embodiment.
Figure 7:
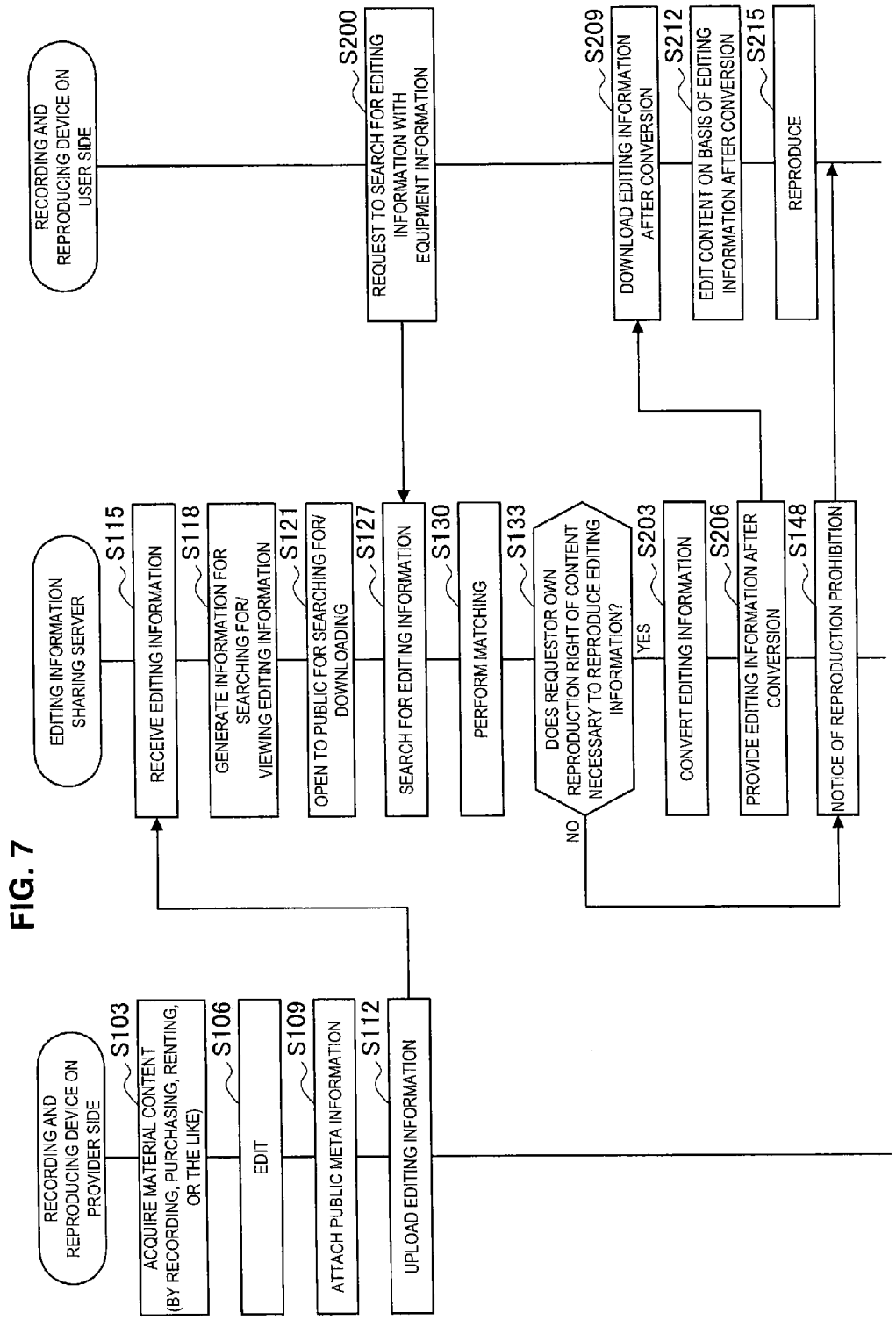
FIG. 7 is a sequence diagram showing an operation process in an editing information sharing system according to the second embodiment.

Next, with reference to FIGS. 6 to 7, the second embodiment according to the present disclosure is explained. In the present embodiment, a format of editing information is converted into an optimal format in accordance with equipment information (for example, information on type or version of recording and reproducing device) of a recording and reproducing device that reproduces the editing information. Accordingly, the editing information can be mutually used between recording and reproducing devices having different types of editing information.

(2-2-1. Configuration)

FIG. 6 is a block diagram showing respective configurations of an editing information sharing system according to the second embodiment. As shown in FIG. 6, a recording and reproducing device 2A-1 on a provider side, a recording and reproducing device 2B-1 on a user side, and an editing information sharing server 1-2 are connected via a network 4 in the editing information sharing system according to the second embodiment.

The configurations of the recording and reproducing device 2A-1 on the provider side and the recording and reproducing device 2B-1 on the user side are similar to the first embodiment explained with reference to FIG. 2. Accordingly, repeated explanation is omitted.

The editing information sharing server 1-2 includes a control unit 10-2, an editing information DB 12, and a communication unit 11. As shown in FIG. 6, the control unit 10-2 functions as a viewing process unit 110, a matching unit 120, and an editing information converting unit 130.

Functions of the viewing process unit 110 and the matching unit 120 are similar to the first embodiment. Accordingly, repeated explanation is omitted.

On the basis of equipment information 330 transmitted from the recording and reproducing device 2B-1 on the user side together with a request to acquire editing information, the editing information converting unit 130 converts a format of editing information to be transmitted to the recording and reproducing device 2B-1 on the user side in a manner that the editing information corresponds with a kind, function, property, and available online channel of the recording and reproducing device 2B-1 on the user side. For example, the editing information converting unit 130 converts a form of editing information, converts the editing information into another function (similar font or effect), or deletes the editing information in a case where the recording and reproducing device 2B-1 on the user side does not have a specific function (font or effect). Specific examples are described below.

(a) Selection of Proper Content Source

In a case where the editing information uses a part of specific content and the recording and reproducing device 2B-1 on the user side serving as a requestor has subscribed to a predetermined content distribution service, the editing information converting unit 130 adds an ID of content distributed in the service, reproduction start position information thereof, and the like to formation. In addition, it is also possible that candidates for contents source are presented and a user selects one.

(b) Conversion to Equivalent Program in a Case where Program Recorded by User is Used In a case where a program set by an editing information creator is not able to receive due to the location but an equivalent program is able to received, the editing information converting unit 130 converts an ID of the program set by the editing information creator to an ID of the equivalent program.

(2-2-2. Operation Process)

Next, with reference to FIG. 7, an operation process according to the second embodiment is explained. FIG. 7 is a sequence diagram showing an operation process in the editing information sharing system according to the second embodiment. Processes in Steps S103 to S121 shown in FIG. 7 are similar to the processes in the steps explained with reference to FIG. 3. Accordingly, repeated explanation is omitted.

Next, in Step S200, the recording and reproducing device 2B-1 on the user side requests the editing information sharing server 1-2 to search for editing information with equipment information.

Subsequently, in Step S127, the control unit 10-2 in the editing information sharing server 1-2 searches the editing information DB 12 for target editing information in response to the request from the recording and reproducing device 2B-1 on the user side.

Next, in Step S130, the matching unit 120 determines whether the requestor owns a reproduction right of content on which the searched editing information depends.

Subsequently, in a case where the requestor owns the reproduction right of the content necessary to reproduce the editing information (YES in Step S133), the editing information converting unit 130 converts the target editing information into optimal editing information on the basis of equipment information of the recording and reproducing device 2B-1 of the user side in Step S203.

Next, in Step S206, the control unit 10-2 transmits the editing information after conversion to the recording and reproducing device 2B-1 on the user side.

Subsequently, in Step S209, the recording and reproducing device 2B-1 on the user side receives (downloads) the editing information after conversion from the editing information sharing server 1-2 via the communication unit 22*b*.

Next, in Step S212, the reproduction control unit 240*b* of the recording and reproducing device 2B-1 on the user side edits the content on the basis of the received editing information after conversion. In Step S215, the content is reproduced by a various output device such as a display device 3B.

As explained above, according to the second embodiment, editing information can be converted into optimal editing information corresponding to functions and properties of the recording and reproducing device 2B-1 on the user side.

<2-3. Third Embodiment>

Figure 8:
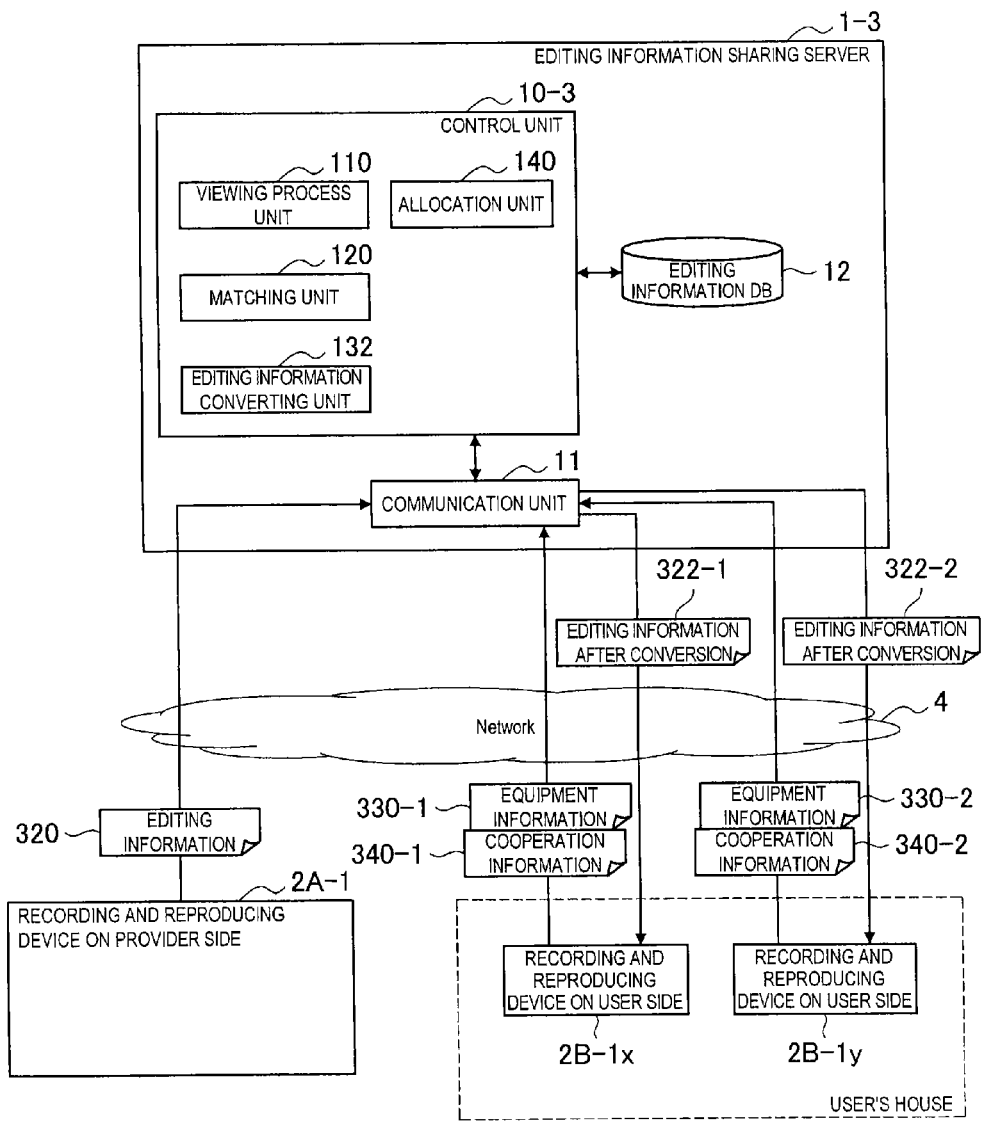
FIG. 8 is a block diagram showing respective configurations of an editing information sharing system according to a third embodiment.
Figure 9:
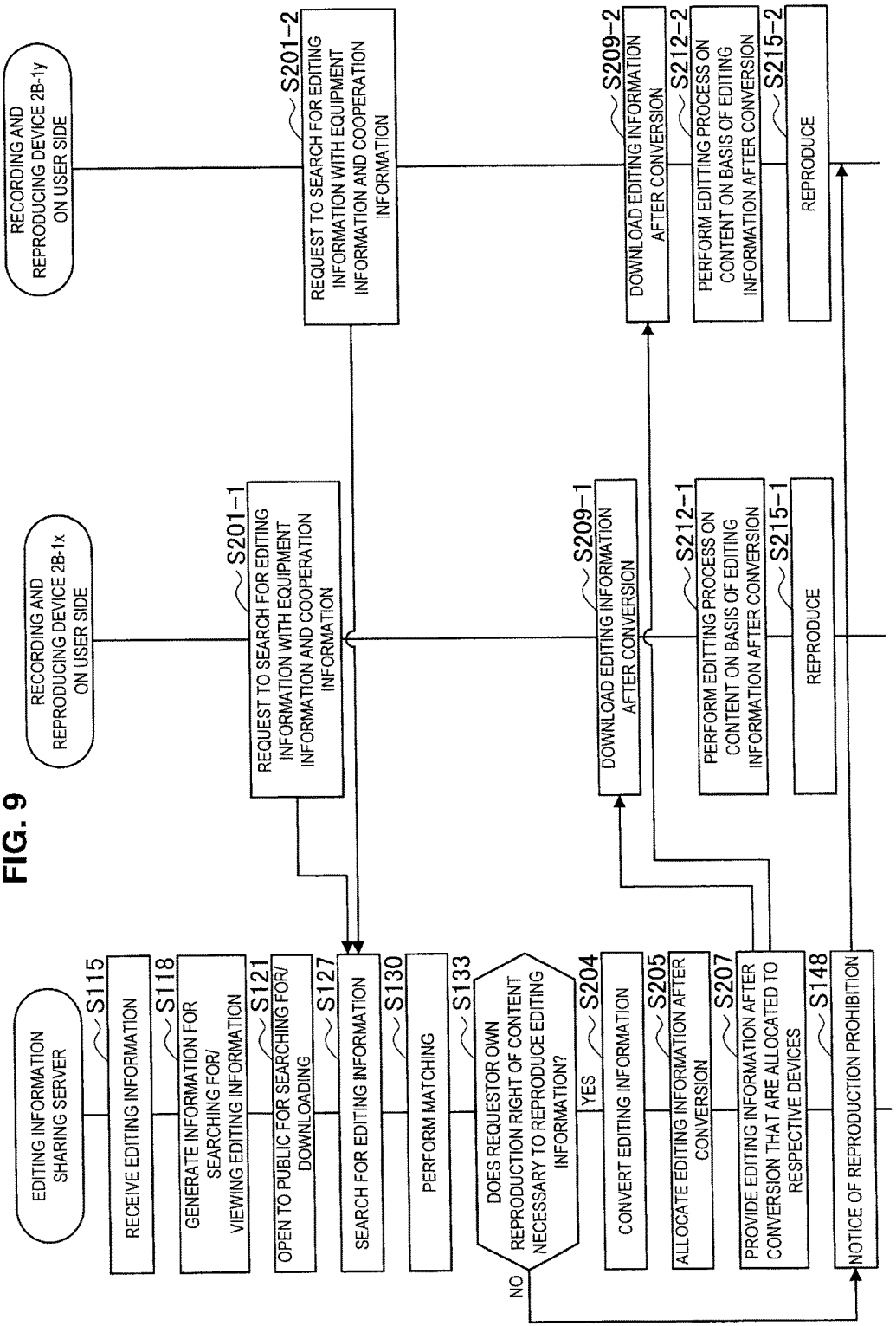
FIG. 9 is a sequence diagram showing an operation process in an editing information sharing system according to the third embodiment.

Next, with reference to FIGS. 8 to 9, the third embodiment according to the present disclosure is explained. According to the present embodiment, in a case where a plurality of recording and reproducing devices that reproduce editing information operate in cooperation with each other, editing information for the plurality of the recording and reproducing devices is converted. Accordingly, editing information is reproduced more effectively by a plurality of recording and reproducing devices.

(2-3-1. Configuration)

FIG. 8 is a block diagram showing respective configurations of an editing information sharing system according to the third embodiment. As shown in FIG. 8, a recording and reproducing device 2A-1 on a provider side, recording and reproducing devices 2B-1*x* and 2B-1*y* on user sides, and an editing information sharing server 1-3 are connected via a network 4 in an editing information sharing system according to the third embodiment.

The configurations of the recording and reproducing device 2A-1 on the provider side and the recording and reproducing devices 2B-1*x* and 2B-1*y* on the user sides are similar to the first embodiment explained with reference to FIG. 2.

Accordingly, repeated explanation is omitted. Note that, the recording and reproducing devices 2B-1*x* and 2B-1*y* on the user sides are not limited to devices for controlling reproduction output from an AV device such as a display device (display) or an audio output device (speaker). The recording and reproducing devices 2B-1*x* and 2B-1*y* on the user sides may be device for controlling output from a light or an air conditioner.

The editing information sharing server 1-3 includes a control unit 10-3, an editing information DB 12, and a communication unit 11. As shown in FIG. 8, the control unit 10-3 functions as a viewing process unit 110, a matching unit 120, an editing information converting unit 132, and an allocation unit 140. Functions of the viewing process unit 110 and the matching unit 120 are similar to the first embodiment. Accordingly, repeated explanation is omitted.

The editing information converting unit 132 converts editing information into editing information for cooperation on the basis of equipment information 330 transmitted from the recording and reproducing device 2B-1 on the user side together with a request to acquire editing information, and on the basis of cooperation information (link information) 340 indicating cooperation between the plurality of recording and reproducing devices on the user sides. Here, editing information may be generated by preliminarily considering that the editing information is reproduced by a plurality of recording and reproducing devices, or may be generated without considering that the editing information is reproduced by a plurality of recording and reproducing devices. Even if the reproduction to be performed by the plurality of recording and reproducing devices is not considered, video content can separate its audio and image to be output, for example. Accordingly, the video content can be converted into video content for cooperation. Hereinafter, specific examples of conversion of editing information for cooperation are described.

(A) Conversion into Information for Multi-Screen in a Case where Plurality of Displays can be Used.

The editing information converting unit 132 converts (divides) editing information in a manner that the editing information is individually allocated to each of a main recording and reproducing device and a sub recording and reproducing device. For example, in a case where a plurality of television screens are arranged on a wall in a house, the editing information converting unit 132 converts editing information into individual pieces of reproduction information (editing information) in a manner that the television screens output a moving image in cooperation with each other.

(B) Multi-Device Cooperation Between Light, Air Conditioner, Tablet, and the Like Reproduction information (editing information) according to functions and properties of cooperating devices (various output devices) is provided on the basis of meta data of content on which the editing information depends. For example, in a case where the content is horror, the editing information converting unit 130 converts information to which information instructing the light to be darker is added, for a light into editing, and converts editing information to which information instructing the air conditioner to lower temperature is added, for an air conditioner. In addition, the editing information converting unit 130 converts editing information to which information for sounding a sound effect at a predetermined timing is added, for the tablet or smartphone.

The allocation unit 140 controls allocation (transmission) of editing information after conversion to each device on the basis of cooperation information indicating cooperation between a plurality of devices transmitted from the recording and reproducing devices 2B-1*x*/2B-1*y* on the user sides. The cooperation information includes information indicating another cooperation device or an arrangement position relation between cooperation devices.

(2-3-2. Operation Process)

Next, with reference to FIG. 9, an operation process according to the third embodiment is explained. FIG. 9 is a sequence diagram showing an operation process in the editing information sharing system according to the third embodiment. Processes in Steps S115 to S121 shown in FIG. 9 are similar to the processes in the same steps explained with reference to FIG. 3. Accordingly, repeated explanation is omitted. In addition, in FIG. 9, processes in Steps S103 to S112 shown in FIG. 3 are also performed before Step S115. However, the processes are not shown in FIG. 9.

Next, in Steps S201-1 and S201-2, the recording and reproducing devices 2B-1*x* and 2B-1*y* on the user sides request the editing information sharing server 1-3 to search for editing information with equipment information and cooperation information. In the example shown in FIG. 9, each of the recording and reproducing devices 2B-1*x* and 2B-1*y* on the user sides requests for searching. However, at least one of the recording and reproducing devices 2B-1x/2B-1y on the user sides may send a request for searching as a representative.

Subsequently, in Steps S127 to S133, the control unit 10-3 in the editing information sharing server 1-3 searches for the editing information and performs matching of a reproduction right in response to the requests from the recording and reproducing devices 2B-1x and 2B-1y on the user sides.

Next, in a case where the requestors own the reproduction right of the content necessary to reproduce the editing information (YES in Step S133), the editing information converting unit 132 converts the target editing information into editing information for cooperation on the basis of equipment information and cooperation information of the recording and reproducing devices 2B-1x and 2B-1y on the user sides in Step S204.

Subsequently, in Step S205, the allocation unit 140 refers to the cooperation information and performs allocation to decide to which recording and reproducing device on user side the editing information after conversion is transmitted.

Next, in Step S207, the control unit 10-3 transmits, to the respective recording and reproducing device 2B-1x and 2b-1y on the user sides, the pieces of editing information after conversion that are allocated to the respective devices by the allocation unit 140.

Subsequently, in Steps S209-1 and S209-2, the recording and reproducing devices 2B-1x and 2B-1y on the user sides receive (download) the respective pieces of editing information after conversion.

Next, in Steps S212-1 and S212-2, the recording and reproducing devices 2B-1x and 2B-1y on the user sides edit the content on the basis of the pieces of received editing information after conversion. Subsequently, in Steps S215-1 and S215-2, the recording and reproducing devices 2B-1x and 2B-1y on the user sides respectively control reproduction. Note that, when the reproduction is started, the respective recording and reproducing devices 2B-1x and 2B-1y on the user sides may match start timings with each other by performing mutual communication. Alternatively, one of the recording and reproducing devices 2B-1x/2B-1y on the user sides serving as the representative may control reproduction performed by the other cooperation device.

As explained above, according to the third embodiment, the recording and reproducing devices 2B-1x/2B-1y on the user sides can cooperate with each other and reproduce the editing information on the basis of the editing information converted for the recording and reproducing devices 2B-1x/2B-1y on the user sides.

Note that, in the above-described operation process, equipment information and cooperation information of a recording and reproducing device are transmitted when a searching for editing information is requested. However, in a case where editing information and cooperation information of a plurality of devices owned by a user are accumulated in the editing information sharing server 1-2 or a predetermined management server, respective recording and reproducing devices do not have to transmit the equipment information and cooperation information.

<2-4. Fourth Embodiment>

Figure 10:
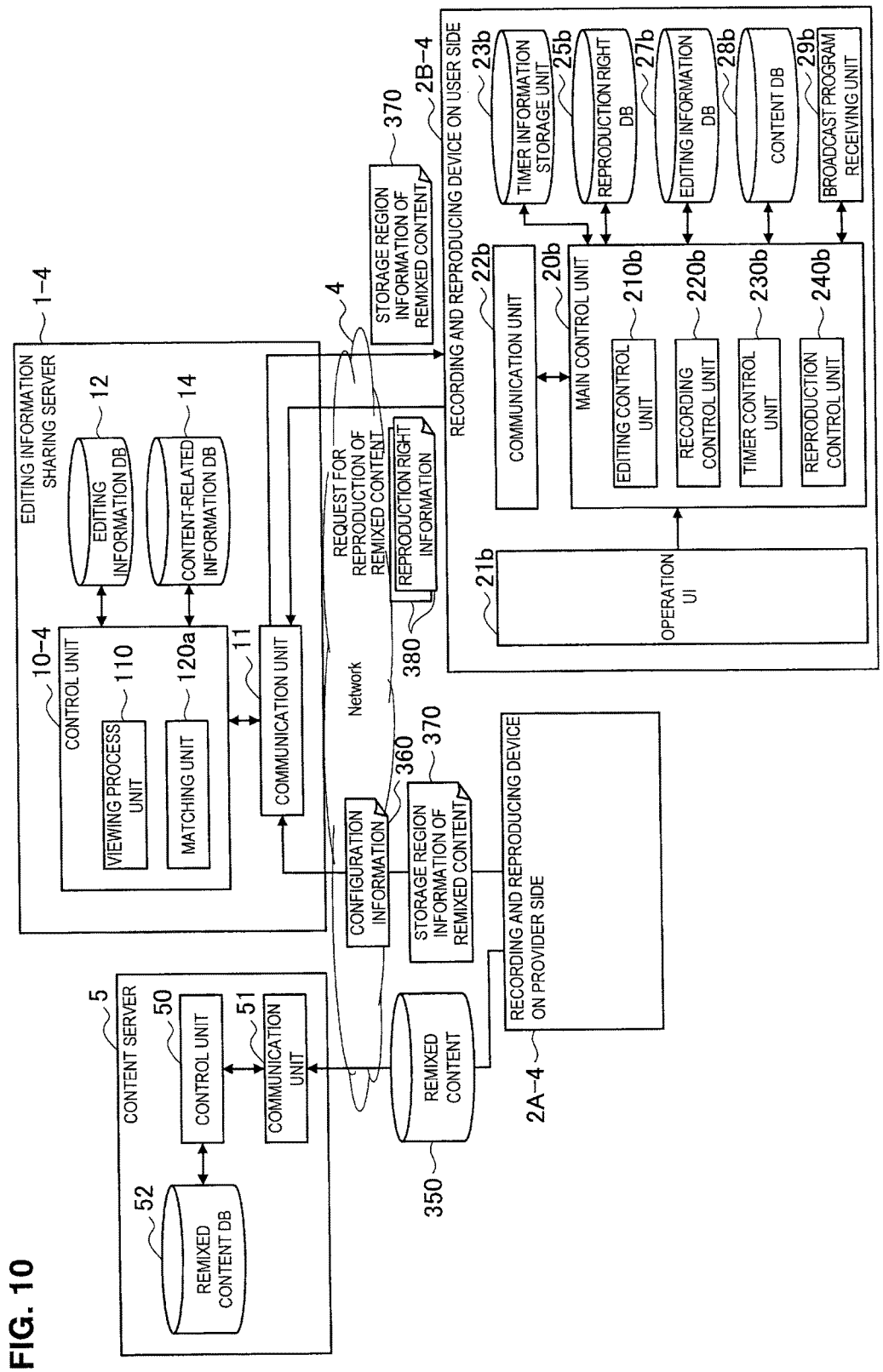
FIG. 10 is a block diagram showing respective configurations of an information sharing system according to a fourth embodiment.
Figure 11:
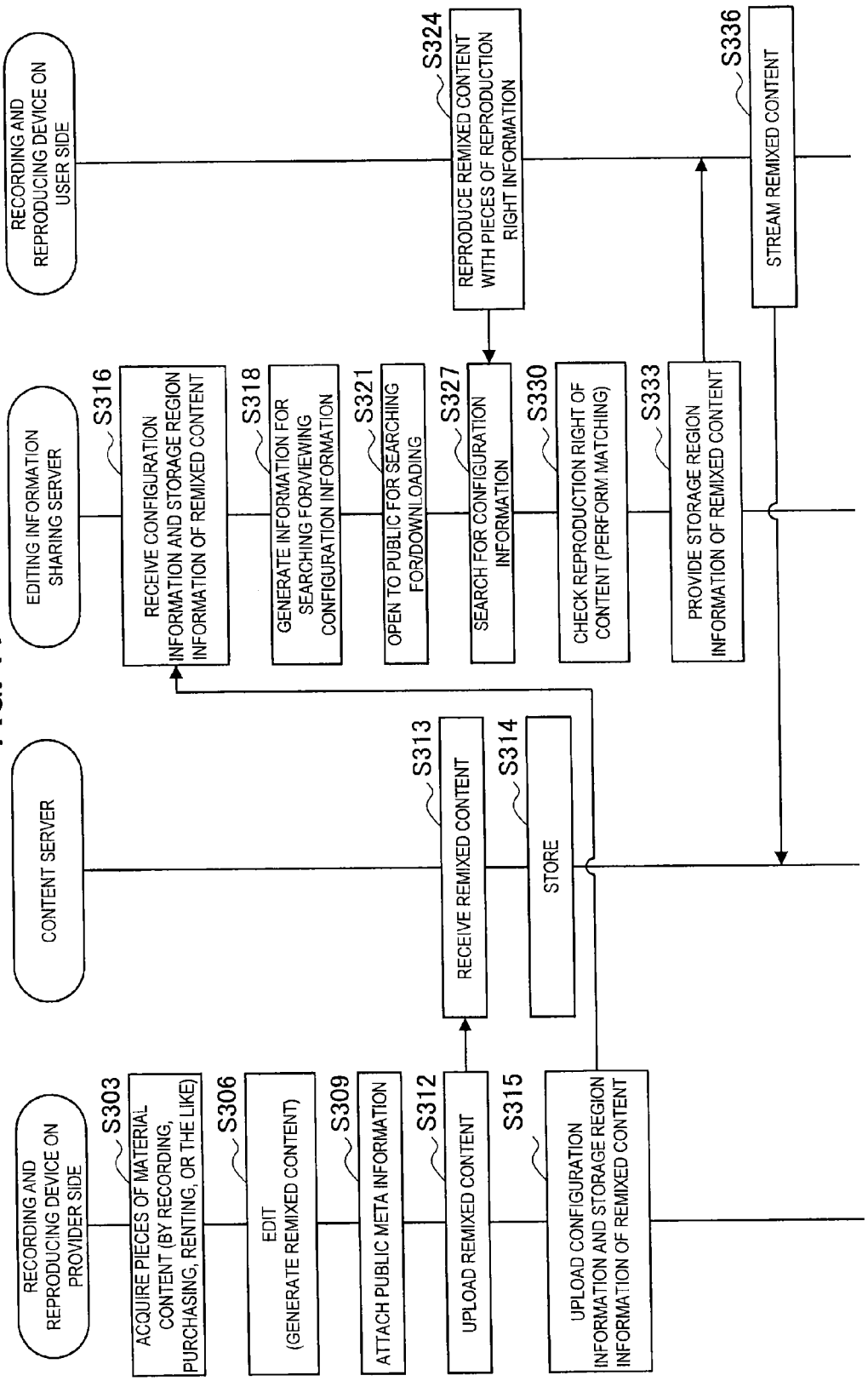
FIG. 11 is a sequence diagram showing an operation process in an information sharing system according to the fourth embodiment.

Next, with reference to FIGS. 10 to 11, the fourth embodiment according to the present disclosure is explained. In the present embodiment, remixed content edited by a recording and reproducing device 2A-4 on a provider side using pieces of content is accumulated in a network, and an editing information sharing server 1-4 returns storage region information of the remixed content in response to a remixed content reproduction request from a recording and reproducing device 2B-4 on a user side. On the basis of the acquired storage region information, the recording and reproducing device 2B-4 on the user side accesses to and streams the remixed content on the network. Accordingly, the recording and reproducing device 2B-4 on the user side can reproduce the remixed content edited on the provider side, while substance of the remixed content is not transmitted/received.

In addition, according to the present embodiment, the recording and reproducing device 2B-4 on the user side owns a reproduction right of content, and reproduction right information is transmitted to the editing information sharing server 1-4 together with a request for reproduction of the remixed content. The editing information sharing server 1-4 performs matching on the basis of the transmitted reproduction right information and configuration information of the remixed content of requested target. In a case where it can be determined that the requestor owns a reproduction right of content constituting the remixed content, the editing information sharing server 1-4 returns the storage region information of the remixed content. As described above, according to the present embodiment, in a case where the recording and reproducing device 2B-4 on the user side owns a reproduction right of original content, the recording and reproducing device 2B-4 on the user side can also reproduce remixed content formed by using the reproduction right on the basis of the original content.

(2-4-1. Configuration)

FIG. 10 is a block diagram showing respective configurations of an editing information sharing system according to the fourth embodiment. As shown in FIG. 10, a recording and reproducing device 2A-4 on a provider side, a recording and reproducing device 2B-4 on a user side, and an editing information sharing server 1-4 are connected via a network 4 in an editing information sharing system according to the fourth embodiment.

The configurations of the recording and reproducing device 2A-4 on the provider side and the recording and reproducing device 2B-4 on the user side are similar. Accordingly, the configurations of the recording and reproducing device 2A-4 on the provider side are not shown in FIG. 10.

The recording and reproducing device 2A-4 on the provider side according to the present embodiment transmits, to a content server 5, remixed content 350 formed on the basis of pieces of content. As shown in FIG. 10, the content server 5 includes a control unit 50, a communication unit 51, and a remixed content DB 52. The control unit 50 causes the remixed content DB 52 to store the remixed content 350 received from the recording and reproducing device 2A-4 on the provider side via the communication unit 51.

In addition, the recording and reproducing device 2A-4 on the provider side transmits, to the editing information sharing server 1-4, configuration information 360 indicating a list of content on which the formed remixed content depends and storage region information 370 of the remixed content. The storage region information 370 of the remixed content is information indicating a storage region of the target remixed content 350 stored in the remixed content DB 52 of the content server 5.

As shown in FIG. 10, the recording and reproducing device 2B-4 on the provider side includes a main control unit 20b, an operation UI 21b, a communication unit 22b, a timer information storage unit 23b, a reproduction right DB 25, an editing information DB 27b, a content DB 28b, and a broadcast program receiving unit 29b.

In the reproduction right DB 25b, reproduction right information of various content is stored. The reproduction right information may be acquired when content stored in the content DB 28b is duly acquired. Alternatively, the reproduction right information is purchased as a ticket via a content distribution service.

Configurations of the recording and reproducing device 2B-4 on the user side other than the reproduction right DB 25b are similar to the first embodiment. Accordingly, repeated explanation is omitted.

As shown in FIG. 10, the editing information sharing server 1-4 includes a control unit 10-4, a communication unit 11, an editing information DB 12, and content-related information DB 14.

The control unit 10-4 receives the configuration information 360 transmitted from the recording and reproducing device 2A-4 on the provider side and the storage region information 370 of the remixed content, and stores them in the content-related information DB 14.

The control unit 10-4 functions as a viewing process unit 110 and a matching unit 120a. In response to the request for reproduction of the remixed content transmitted from the recording and reproducing device 2B-4 on the user side via the communication unit 11, the matching unit 120a performs matching of pieces of original content that are basis for the requested remixed content and reproduction right information 380 transmitted together with the request for reproduction.

In accordance with a result of determination of the matching unit 120a, the control unit 10-4 controls whether to transmit storage region information 370 of the remixed content to the recording and reproducing device 2B-4 on the user side that is a requestor of the reproduction. In a case where it is determined that the requestor owns reproduction rights of the pieces of original content that are the basis of the remixed content, the control unit 10-4 transmits the storage region information 370 of the remixed content to the recording and reproducing device 2B-4 on the user side that is the requestor of the reproduction.

(2-4-2. Operation Process)

Next, with reference to FIG. 11, an operation process according to the fourth embodiment is explained. FIG. 11 is a sequence diagram showing an operation process in an information sharing system according to the fourth embodiment.

As shown in FIG. 11, first, in Step S103, the recording and reproducing device 2A-4 on the provider side acquires pieces of material content.

Next, in Step S306, in response to an editing operation performed by a user, the recording and reproducing device 2A-4 on the provider side performs an editing process on the pieces of material content (original content), and forms remixed content.

Subsequently, in Step S309, the recording and reproducing device 2A-4 on the provider side attaches public meta information to editing information indicating details of editing to be performed on the remixed content. At this time, a list of dependent content (configuration information) is also generated as public meta information.

Next, in Step S312, the recording and reproducing device 2A-4 on the provider side transmits (uploads) and stores the remixed content to/in the content server 5.

Subsequently, in Step S313, the content server 5 receives the remixed content 350 via the communication unit 51. In Step S314, the content server 5 stores the received remixed content 350 in the remixed content DB 52.

Next, in Step S315, the recording and reproducing device 2A-4 on the provider side transmits (uploads), to the editing information sharing server 1-4, configuration information of the remixed content and storage region information of the remixed content 350 stored in the content server 5. Note that, the recording and reproducing device 2A-4 on the provider side may transmit editing information catalog including such configuration information and storage region information.

Subsequently, in Step S316, the editing information sharing server 1-4 receives the configuration information and the storage region information of the remixed content from the recording and reproducing device 2A-4 on the provider side via the communication unit 11. The received configuration information and storage region information are stored in the content-related information DB 14.

Next, in Step S318, the viewing process unit 110 generates information for searching for/viewing configuration information (or editing information catalog including configuration information.

Next, in Step S321, the viewing process unit 110 opens the configuration information (or editing information catalog including configuration information) to the public for searching for/downloading the configuration information (or the editing information catalog including configuration information).

Subsequently, in Step S324, the recording and reproducing device 2B-4 on the user side sends, to the editing information sharing server 1-4, a reproduction request of the remixed content associated with desired configuration information among pieces of public configuration information (or editing information catalog including configuration information). At this time, by referring to the configuration information, the recording and reproducing device 2B-4 on the user side sends the reproduction request with the reproduction right information of the pieces of original content used for forming the remixed content.

Next, in Step S327, the control unit 10-4 in the editing information sharing server 1-4 searches the content-related information DB 14 for target configuration information in response to the request from the recording and reproducing device 2B-4 on the user side.

Subsequently, in Step S330, the matching unit 120a determines whether the requestor owns a reproduction right of content indicated by configuration information of the requested target (content necessary to reproduce remixed content). Specifically, the matching unit 120a determines whether the requestor owns a reproduction right of the necessary content on the basis of the reproduction right information transmitted from the recording and reproducing device 2B-4 on the user side.

Next, in a case where the matching unit 120 determines that the requestor owns the reproduction right of the necessary content, the control unit 10-4 transmits storage region information of the target remixed content to the recording and reproducing device 2B-4 on the user side in Step S333.

Subsequently, in Step S336, the reproduction control unit 240b of the recording and reproducing device 2B-4 on the user side accesses to the content server 5 and streams the remixed content on the basis of the storage region information transmitted from the editing information sharing server 1-4.

As explained above, according to the fourth embodiment, in a case where the recording and reproducing device 2B-4 on the user side owns a reproduction right, the reproduction right information of pieces of original content is transmitted to the editing information sharing server 1-4 together with a reproduction request of the remixed content, and storage region information of the remixed content can be acquired. In addition, the storage region information of the remixed content is shared, and the recording and reproducing device 2B-4 on the user side accesses to the content server 5 and performs streaming on the basis of the storage region information. Accordingly, the recording and reproducing device 2B-4 on the user side can reproduce the remixed content, while substance of the remixed content is not transmitted/received.

<2-5. Fifth Embodiment>

Figure 12:
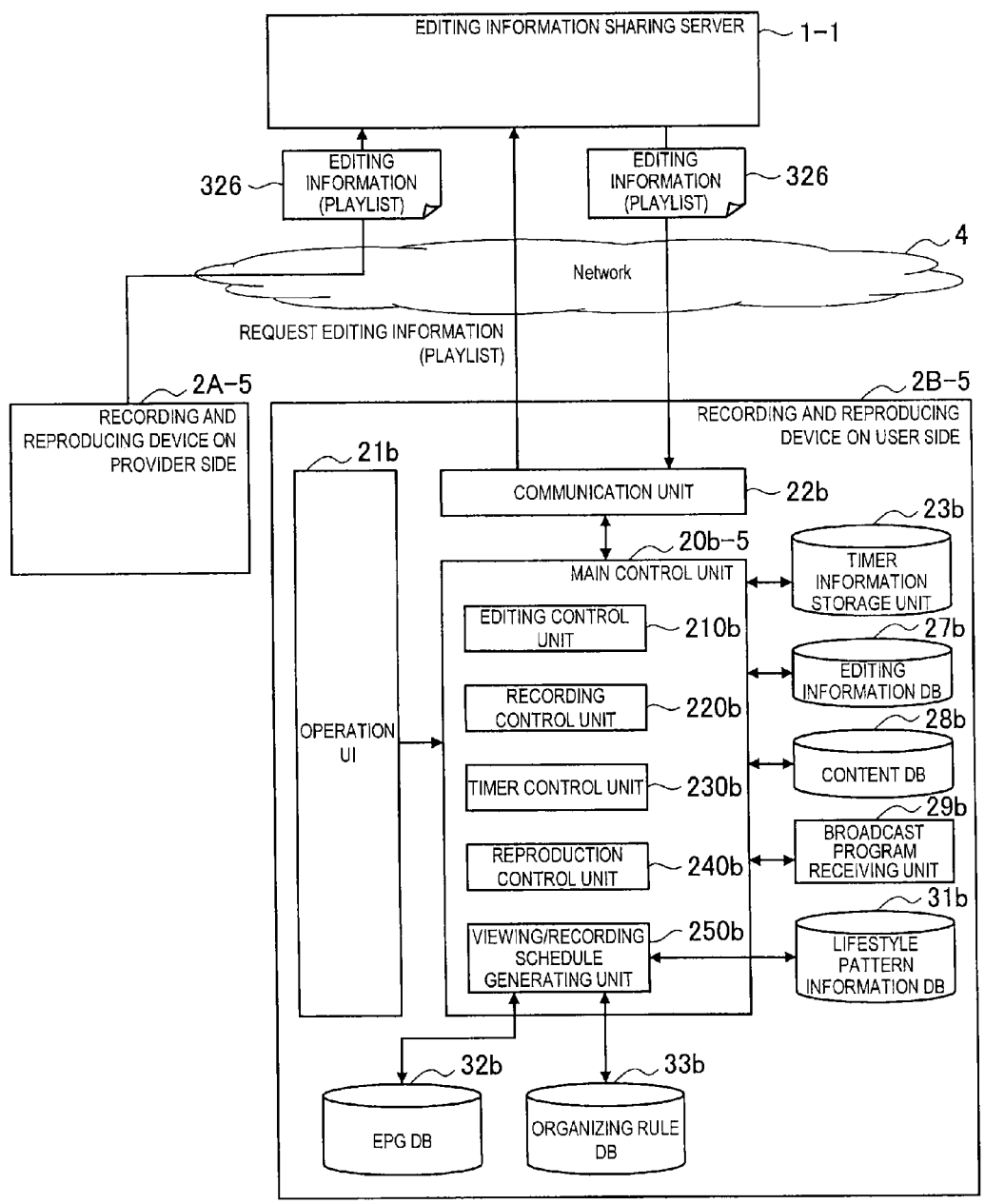
FIG. 12 is a block diagram showing respective configurations of an editing information sharing system according to a fifth embodiment.
Figure 13:
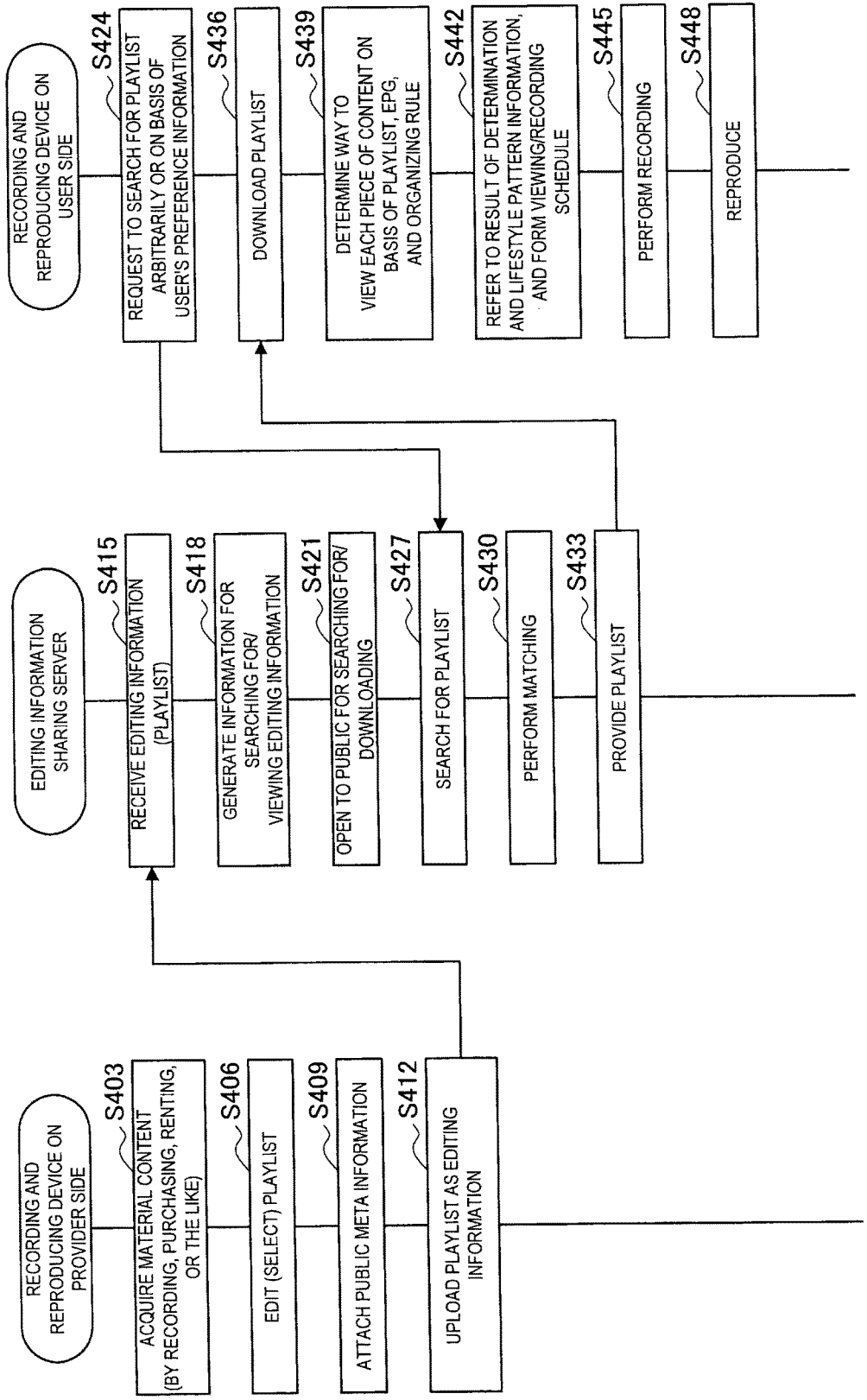
FIG. 13 is a sequence diagram showing an operation process in an editing information sharing system according to the fifth embodiment.
Figure 14:
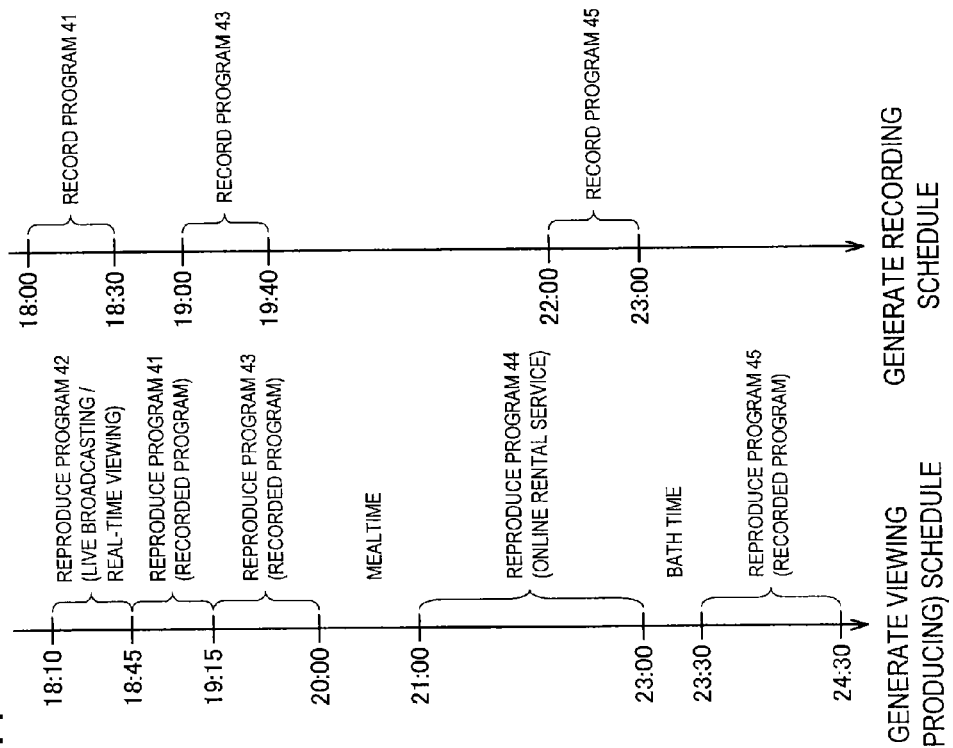
FIG. 14 is a diagram illustrating generation of a playlist and generation of a viewing/recording schedule according to the fifth embodiment.

Next, with reference to FIGS. 12 to 14, the fifth embodiment according to the present disclosure is explained. In the above-described embodiments, editing information is used as details of editing performed on one or more pieces of content. However, the editing information according to the embodiments of the present disclosure is not limited thereto. For example, as the editing information, a playlist of a live broadcast program, recorded program, pay per view (PPV) content and the like may be used. According to the fifth embodiment as described below, an optimal viewing schedule (recording/reproduction schedule) depending on a user's lifestyle pattern can be automatically generated in accordance with acquired playlist in a case where the playlist serves as editing information.

(2-5-1. Configuration)

FIG. 12 is a block diagram showing respective configurations of an editing information sharing system according to the fifth embodiment. As shown in FIG. 12, a recording and reproducing device 2A-5 on a provider side, a recording and reproducing device 2B-5 on a user side, and an editing information sharing server 1-1 are connected via a network 4 in the editing information sharing system according to fifth embodiment.

The configurations of the recording and reproducing device 2A-5 on the provider side and the recording and reproducing device 2B-5 on the user side are similar. Accordingly, the configurations of the recording and reproducing device 2A-5 on the provider side are not shown in FIG. 12.

The recording and reproducing device 2A-5 on the provider side according to the present embodiment generates a playlist including pieces of content in response to a content selection operation performed by a user, and the recording and reproducing device 2A-5 on the provider side transmits the generated playlist as editing information 326 to the editing information sharing server 1-1. The configuration of the editing information sharing server 1-1 is similar to the editing information sharing server 1-1 according to the present embodiment that has been explained with reference to FIG. 2. Accordingly, repeated explanation is omitted.

Note that, in the present embodiment, a case where the recording and reproducing device 2A-5 on the provider side generates a playlist and the recording and reproducing device 2B-5 on the user side automatically generates the viewing schedule based on the playlist is explained. However, the present embodiment is not limited thereto. For example, the viewing schedule may be automatically generated on the basis of a playlist generated by the user himself/herself. That is, a user of the recording and reproducing device 2 also can cause a viewing schedule to be automatically generated on the basis of a playlist generated by the user himself/herself.

As shown in FIG. 12, the recording and reproducing device 2B-5 on the user side includes a main control unit 20b-5, an operation UI 21b, a communication unit 22b, a timer information storage unit 23b, an editing information DB 27b, a content DB 28b, a broadcast program receiving unit 29b, lifestyle pattern information DB 31b, broadcast electronic program guide (EPG) DB 32b, and an organizing rule DB 33b. The operation UI 21b, the communication unit 22b, the timer information storage unit 23b, the editing information DB 27b, the content DB 28b, and the broadcast program receiving unit 29b are similar to the first embodiment. Accordingly, repeated explanation is omitted.

For example, the lifestyle pattern information DB 31b stores a pattern based on a history such as viewing time, viewing program (reproduction content) and the like of the user. Specifically, a viewing pattern in the user's life indicating that the user views a YY program every Friday at 21:00, the user views a WW program every weekday, and the user does not view any program after 24:00 from Saturday to Thursday is stored, for example. In addition to the above-described viewing pattern, patterns of wake-up time, bedtime, mealtimes, bath time, time for going out, and the like may be stored. The wake-up time, bedtime, mealtimes, bath time, time for going out may be manually input by the user using the operation UI 21b, or may be acquired from schedule information of the user.

The electronic program guide DB 32b stores electronic program guides (EPG) transmitted from broadcast stations and acquired via a receiving antenna or an IP network. The organizing rule DB 33b stores an organizing rule to be referred to when a viewing/recording schedule generating unit 250b generates a viewing schedule. For example, the organizing rule is to prioritize real-time viewing in a case of a live broadcast program, or to prioritize continuous viewing in a case of movies, serial drama, sports or the like.

The main control unit 20b-5 functions as an editing control unit 210b, a recording control unit 220b, a timer control unit 230b, a reproduction control unit 240b, and a viewing/recording schedule generating unit 250b.

The viewing/recording schedule generating unit 250b has a function of generating a viewing (reproducing)/recording schedule on the basis of a playlist acquired as the editing information 326 from the editing information sharing server 1-1. Specifically, the viewing/recording schedule generating unit 250b automatically generates a viewing schedule of content included in the playlist received as the editing information 326 from the editing information sharing server 1-1, in accordance with a user's lifestyle pattern grasped by referring to the lifestyle pattern information DB 31b. At this time, the viewing/recording schedule generating unit 250b also generates a recoding schedule because one of broadcast programs whose broadcasting times are overlapped has to be recorded.

(2-5-2. Operation Process)

Next, with reference to FIG. 13, an operation process according to the fifth embodiment is explained. FIG. 13 is a sequence diagram showing an operation process in the editing information sharing system according to the fifth embodiment. As shown in FIG. 13, first, in Step S403, the recording and reproducing device 2A-5 on the provider side acquires material content.

Next, in Step S406, the recording and reproducing device 2A-5 on the provider side generates a playlist (editing information 326) in response to an editing operation (selection operation) performed on content by a user. Hereinafter, with reference to FIG. 14, an example of generation of the playlist is explained. FIG. 14 is a diagram illustrating generation of the playlist and generation of the viewing/recording schedule according to the present embodiment.

As shown in the left-hand side of FIG. 14, a user can generate a playlist by selecting programs 41, 42, 43, and 45 from an electronic program guide 40 and selecting a movie 44 available for rent via the Internet, for example.

Subsequently, in Step S409, the recording and reproducing device 2A-5 on the provider side attaches public meta information indicating details of the playlist. For example, a list or types of pieces of content included in the playlist is attached as meta information.

Next, in Step S412, the recording and reproducing device 2A-5 on the provider side transmits (uploads) the playlist as the editing information 326 to the editing information sharing server 1-1.

Subsequently, in Step S415, the editing information sharing server 1-1 receives the editing information 326 (playlist) from the recording and reproducing device 2A-5 on the provider side.

Next, in Step S418, the editing information sharing server 1-1 generates information for searching for/viewing the editing information.

Subsequently, in Step S421, the editing information sharing server 1 opens the editing information 326 to the public for searching for/downloading the editing information.

Next, in Step S424, the recording and reproducing device 2B-5 on the user side requests the editing information sharing server 1-1 to search for the editing information (playlist). The editing information requested to be searched for may be arbitrarily selected by the user from among pieces of public editing information, or may be automatically selected by the recording and reproducing device 2B-5 on the user side on the basis of the user's preference information. The user's preference information may be acquired by analyzing the user's viewing/reproducing history and the user's lifestyle pattern (user's viewing pattern), for example.

Subsequently, in Step S427, the editing information sharing server 1-1 searches for the target editing information 326 (playlist) in response to the request from the recording and reproducing device 2B-5 on the user side.

Next, in Step S430, the editing information sharing server 1-1 determines whether the requestor (user or recording and reproducing device 2B-5 on the user side) owns a reproduction right of content indicated by editing information of the requested target (content necessary to reproduce the playlist). Note that, a reproduction right of an unbroadcast program can be duly acquired by recording at a time when the unbroadcast program is broadcasted. Accordingly, the editing information sharing server 1-1 may determine whether the reproduction right is present in accordance with whether the recording and reproducing device 2B-5 on the user side can receive the target unbroadcast program.

Subsequently, in a case where it is determined that the requestor owns the reproduction right of the necessary content, the editing information sharing server 1-1 transmits the target editing information 326 (playlist) to the recording and reproducing device 2B-5 on the user side in Step S433.

Next, in Step S436, the recording and reproducing devices 2B-5 on the user side receives (downloads) the playlist (editing information 326).

Subsequently, in Step S439, the viewing/recording schedule generating unit 250b of the recording and reproducing device 2B-5 on the user side determines a way to view each piece of content included in the playlist (for example, real-time viewing or continuous viewing) on the basis of the playlist (editing information 326), the electronic program guide, and the organizing rule. For example, the viewing/recording schedule generating unit 250b determines to perform real-time viewing in a case of a live broadcast program, or to perform continuous viewing in a case of movies, serial drama, sports or the like.

Next, in Step S442, the viewing/recording schedule generating unit 250b refers to a result of the determination and the lifestyle pattern information, and forms a viewing/recording schedule. Next, with reference to FIG. 14, details of the formation of viewing/recording schedule are explained.

For example, in a case where the user can view TV after 18:00 according to the lifestyle pattern information (or in a case where the user inputs that viewing after 18:00 is possible), the program 42 that is live broadcast program in the playlist (editing information 326) is determined as a program to be viewed in real-time in accordance with the organizing rule. Accordingly, as shown in the right-hand side of FIG. 14, the schedule is set in a manner that the program 42 is reproduced (viewed in real time) at 18:10. Accordingly, the user does not view the program 41 to be broadcasted at 18:00 in real time. That is, a recording schedule for recording the program 41 is formed.

In addition, the movie 44 available for rent via the Internet is determined as movie to be viewed continuously in accordance with the organizing rule. In a case where reproduction time length of the movie 44 is two hours, for example, the movie 44 is finished at 20:45 when the movie 44 is reproduced at 18:45 after the real time viewing of the program 42 is finished. However, the continuous viewing is difficult to be performed because 20:00 is mealtime according to the user's lifestyle pattern. Therefore, the viewing/recording schedule generating unit 250b adjusts the viewing schedule until 20:00 by using another program having shorter reproduction time length.

For example as shown in the right-hand side of FIG. 14, the viewing schedule is set in a manner that the recorded program 41 is reproduced at 18:45 after the real time viewing of the program 42 is finished. In this case, the program 41 finishes at 19:45 because the reproduction time length of the program 41 is 30 minutes. In this case, the user does not view the program 43 to be broadcasted at 19:00 in real time. That is, a recording schedule for recording the program 43 is generated.

In addition, for example, the viewing schedule is set in a manner that the recorded program 43 is reproduced at 19:15 after the reproduction of the recorded program 42 is finished. Accordingly, the reproduction of the program 43 is finished before 20:00.

In addition, after 21:00 when the mealtime is finished, the user has two hours before the bath time at 23:00. Accordingly, as shown in the right-hand side of FIG. 14, the viewing/recording schedule generating unit 250b generates a schedule for reproducing the movie 44. In this case, the user does not view the program 45 to be broadcasted at 22:00 in real time. That is, a recording schedule for recording the program 45 is generated. Note that, from 23:30 after the bath time to the bedtime at 25:00, the user has only one and a half hours. Accordingly, it is difficult to view the movie 44 continuously, and an optimal schedule is set in a manner that the movie 44 is reproduced at 21:00 after the mealtime.

The viewing schedule is set in a manner that the recorded program 45 is reproduced at 23:30 after the bath time. Accordingly, the reproduction can be finished before the bedtime at 25:00, since the reproduction time length of the program 45 is one hour.

As described with reference to FIG. 14, the viewing/recording schedule generating unit 250b adjusts viewing/recording on the basis of information (broadcast stat/finish time, details of broadcast content, reproduction time length, and the like) on each piece of content included in the playlist, an organizing rule, and a lifestyle pattern so as to generate a viewing/recording schedule optimal for a user.

Next, in Step S445, the recording control unit 220a controls recoding of the broadcast programs in accordance with the recoding schedule generated by the viewing/recording schedule generating unit 250b.

In addition, in Step S448, the reproduction control unit 2406 controls reproduction of each piece of content in accordance with the viewing (reproducing) schedule generated by the viewing/recording schedule generating unit 250b.

According to the fifth embodiment as described above, an optimal viewing/recording schedule depending on the user's lifestyle pattern can be generated and executed with respect to each piece of content included in the playlist.

<2-6. Sixth Embodiment>

Figure 15:
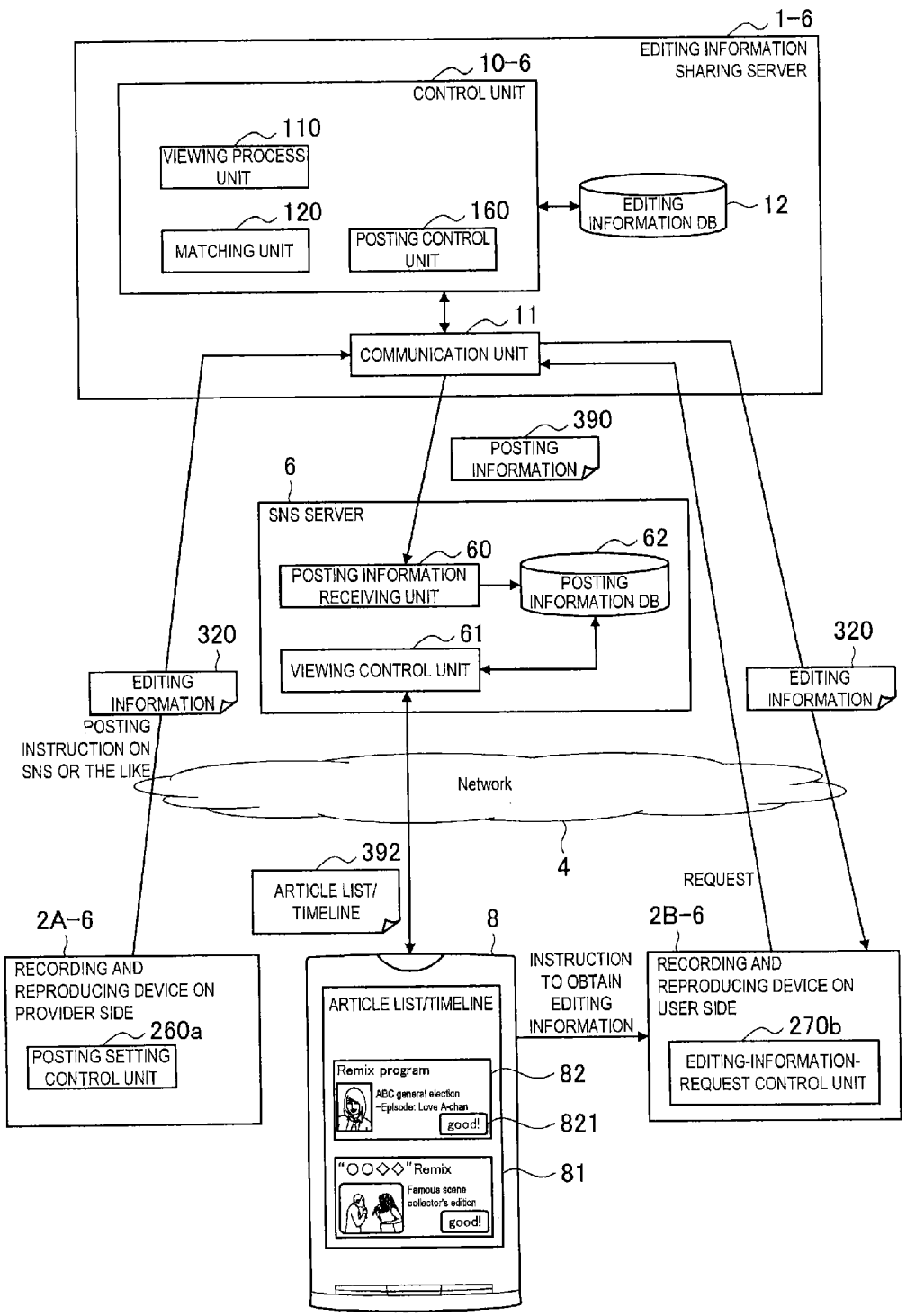
FIG. 15 is a block diagram showing respective configurations of an editing information sharing system according to a sixth embodiment.
Figure 16:
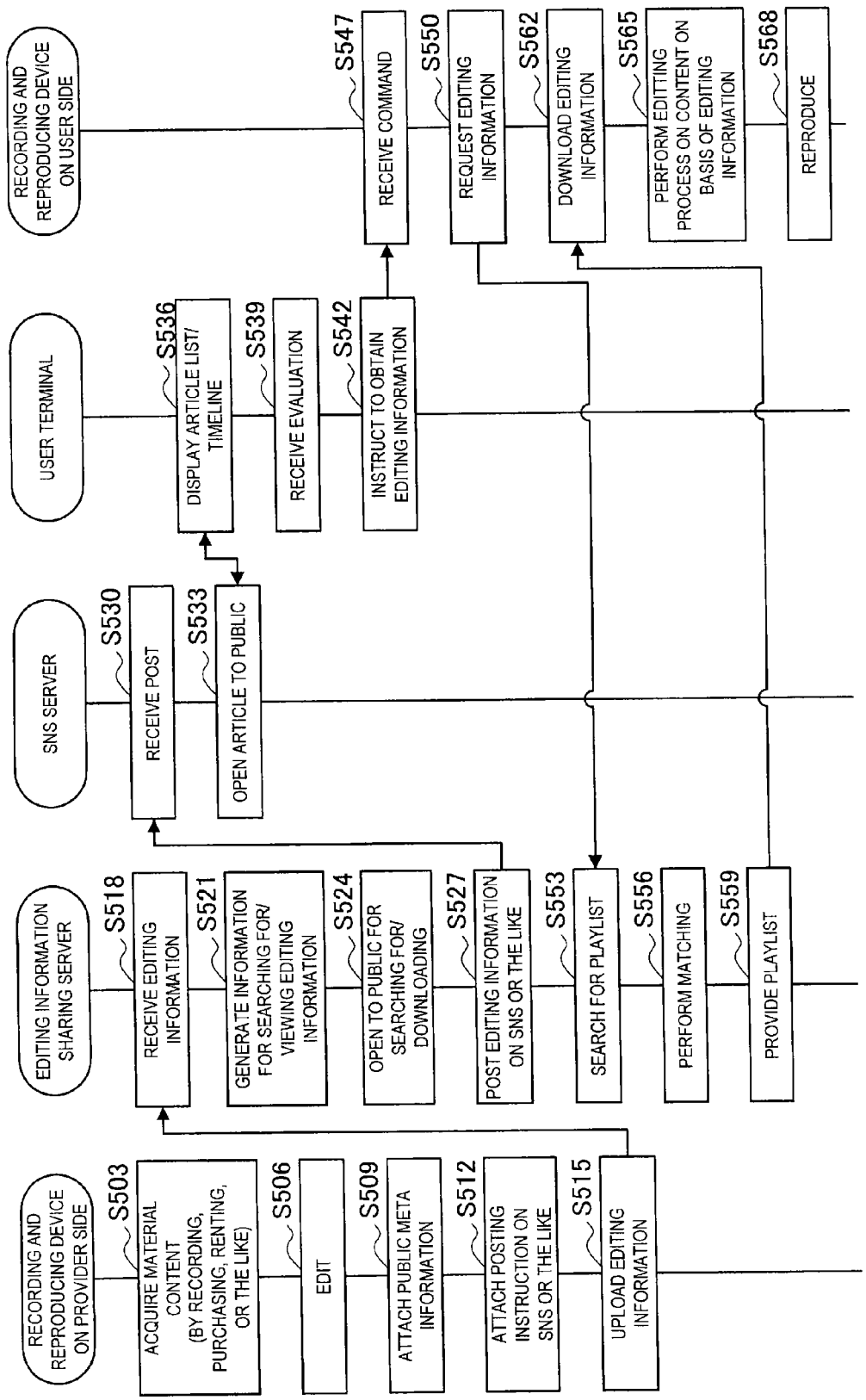
FIG. 16 is a sequence diagram showing an operation process in an editing information sharing system according to the sixth embodiment.

Next, with reference to FIGS. 15 to 16, the sixth embodiment according to the present disclosure is explained. In a case where editing information is shared on a social network service (SNS) or the like according to the present embodiment, the recording and reproducing device 2 can automatically requests the editing information from the editing information sharing server 1 in accordance with evaluation performed by users on the SNS.

(2-6-1. Configuration)

FIG. 15 is a block diagram showing respective configurations of an editing information sharing system according to the sixth embodiment. As shown in FIG. 15, a recording and reproducing device 2A-6 on a provider side, a recording and reproducing device 2B-6 on a user side, and an editing information sharing server 1-6, a SNS server 6, and a user terminal 8 are connected via a network 4 in the editing information sharing system according to sixth embodiment.

The recording and reproducing device 2A-6 on the provider side has a posting setting control unit 260a. The posting setting control unit 260a performs control in a manner that the generated editing information 320 is transmitted to the editing information sharing server 1-6 together with a posting instruction on the SNS.

As shown in FIG. 15, an editing information sharing server 1-6 includes a control unit 10-6, a communication unit 11, and an editing information DB 12. The control unit 10-6 functions as a viewing process unit 110, a matching unit 120, and a posting control unit 160.

In accordance with the posting instruction on the SNS or the like from the recording and reproducing device 2A-6 on the provider side, the posting control unit 160 performs control in a manner that posting information 390 including the generated editing information 320 is transmitted to the SNS server 6.

As shown in FIG. 15, the SNS server 6 includes a posting information receiving unit 60, a viewing control unit 61, and a posting information DB 62. The posting information receiving unit 60 receives the posting information by storing the posting information 390 transmitted from the editing information sharing server 1-6 in the posting information DB 62.

The posting information DB 62 stores the posting information that is transmitted from the editing information sharing server 1-6 and various information processing devices (PCs, smartphones, tablet terminals, and the like) and that is received by the posting information receiving unit 60.

In response to access from the various information processing devices, the viewing control unit 61b controls screen information of article list/timeline (screen on which one or more pieces of information is arranged in chronological order) to be transmitted, the article list/timeline being generated from the posting information stored in the posting information DB 62. For example, in response to access from the user terminal 8, the viewing control unit 61b transmits screen information 392 of article list/timeline generated from posting information.

The user terminal 8 is an information processing device such as a smartphone, tablet terminal, or PC, and is used by a user of the recording and reproducing device 2B-6 on the user side. As shown in FIG. 15, the user terminal 8 displays a screen of the article list/timeline on a display unit 81 on the basis of the screen information 392 of the article list/timeline received from the SNS server 6 connecting via the network 4. The posting information (article) displayed on the screen of the article list/timeline is generated from the editing information 320. For example, the posting information includes a title and an abstract of the editing information 320, and dependent content etc.

The user can view the article list/timeline by using the display unit 81 of the user terminal 8, and can input evaluation of a post that the user likes or a post that the user wants to view. Specifically, as shown in FIG. 15, the user inputs evaluation by tapping an evaluation button 821 included in an article 82 that is posting information, the evaluation button 821 indicating that the user like this article.

When an intention that the user likes the target post information is declared by tapping the evaluation button 821, the user terminal 8 instructs the recording and reproducing device 2B-6 on the user side to obtain the post information.

The recording and reproducing device 2B-6 on the user side includes an editing-information-request control unit 270b. In response to the instruction to obtain the editing information issued by the user terminal 8, the editing-information-request control unit 270b performs control to request the editing information from the editing information sharing server 1-6. When receiving the editing information from the editing information sharing server 1-6 in response to the request, the recording and reproducing device 2B-6 on the user side edits content on the basis of the received editing information 320 and reproduces the edited content. As described above, when the user inputs evaluation of the editing information shared on the SNS, the evaluation indicating that the user likes the editing information, the recording and reproducing device 2B-6 on the user side automatically acquires the target editing information.

(2-6-2. Operation Process)

Next, with reference to FIG. 16, an operation process according to the sixth embodiment is explained. FIG. 16 is a sequence diagram showing an operation process in the editing information sharing system according to the sixth embodiment. As shown in FIG. 16, first in Steps S503 to 509, the recording and reproducing device 2A-6 on the provider side edits the acquired material content and attaches public meta information to editing information indicating details of editing.

Subsequently, in Step S512, the posting setting control unit 260a of the recording and reproducing device 2A-6 on the provider side attaches a posting instruction on the SNS or the like to the editing information. The posting instruction on the SNS or the like includes information such as a password, a user ID, and which SNS to post.

Next, in Step S515, the posting setting control unit 260a transmits the editing information to the editing information sharing server 1-6 together with the posting instruction.

Subsequently, in Steps S518 to S524, the control unit 10-6 of the editing information sharing server 1-6 stores the received editing information in the editing information DB 12, generates the information for searching for/viewing the editing information on the basis of the received editing information, and opens the editing information to the public for searching for/downloading the editing information.

Next, in Step S527, the posting control unit 160 of the editing information sharing server 1-6 transmits (posts) the posting information including the editing information to (on) the SNS server 6 in response to a posting instruction from the recording and reproducing device 2A-6 on the provider side.

Next, in Step S530, the posting information receiving unit 60 of the SNS server 6 receives the posting information transmitted from the editing information sharing server 1-6.

Next, in Step S533, the viewing control unit 61 opens the posting information (article) to the public via the network.

Subsequently, in Step S536, the user terminal 8 accesses to the SNS server 6, acquires screen information of the article/timeline, and m on the basis of the acquired information. Accordingly, the user can view the posting information (article).

Next, in Step S539, the user terminal 8 receives evaluation by the user with regard to the posting information.

Subsequently, in Step S542, the user terminal 8 instructs the recording and reproducing device 2B-6 on the user side to obtain editing information indicated by the target posting information to which evaluation indicating that the user likes the posting information is input.

Next, in Step S547, the recording and reproducing device 2B-6 on the user side receives a command instructing to obtain the editing information. In Step S550, the editing-information-request control unit 270b sends the request for acquisition of the editing information to the editing information sharing server 1-6.

Subsequently, in Step S553, the control unit 10-6 in the editing information sharing server 1-6 searches the editing information DB 12 for target editing information in response to the request from the recording and reproducing device 2B-6 on the user side.

Next, in Step S556, the matching unit 120 determines whether the requestor owns a reproduction right of content necessary to reproduce the editing information requested as the target.

Next, in Step S559, the control unit 10-6 transmits the target editing information to the recording and reproducing device 2B-6 on the user side after confirming that the requestor owns the reproduction right. Note that, in a case where the content necessary to reproduce the editing information includes an unbroadcast program, a reproduction right of the unbroadcast program can be duly acquired by recording at a time when the unbroadcast program is broadcasted. Accordingly, the matching unit 120 may determine whether the reproduction right is present in accordance with whether the recording and reproducing device 2B-6 on the user side can receive the target unbroadcast program.

Next, in Step S562, the recording and reproducing device 2B-6 on the user side receives (downloads) the editing information from the editing information sharing server 1-6.

Subsequently, in Step S565, the recording and reproducing device 2B-6 on the user side edits the content on the basis of the received editing information. In Step S568, the content is reproduced by a various output device such as a display device 3B.

As described above, according to the sixth embodiment, when the user inputs evaluation of an article (posting information) of the editing information shared on the SNS, the evaluation indicating that the user likes the editing information, the recording and reproducing device 2B-6 on the user side automatically acquires the target editing information.

Note that, the posting information does not have to be transmitted to the SNS server 6 via the editing information sharing server 1-6. For example, the posting information may be directly transmitted from the recording and reproducing device 2A-6 on the provider side, or may be transmitted from an information processing device such as a PC/smartphone via a web browser or an application. In this case, the recording and reproducing device 2A-6 on the provider side separately transmits the editing information to the editing information sharing server 1-6.

In addition, the user terminal 8 does not have to instruct the recording and reproducing device 2B-6 on the user side to obtain the editing information. For example, via the SNS server 6, the user terminal 8 instructs the editing information sharing server 1-6 to transmit the editing information to the recording and reproducing device 2B-6 on the user side.

<2-7. Seventh Embodiment>

Figure 17:
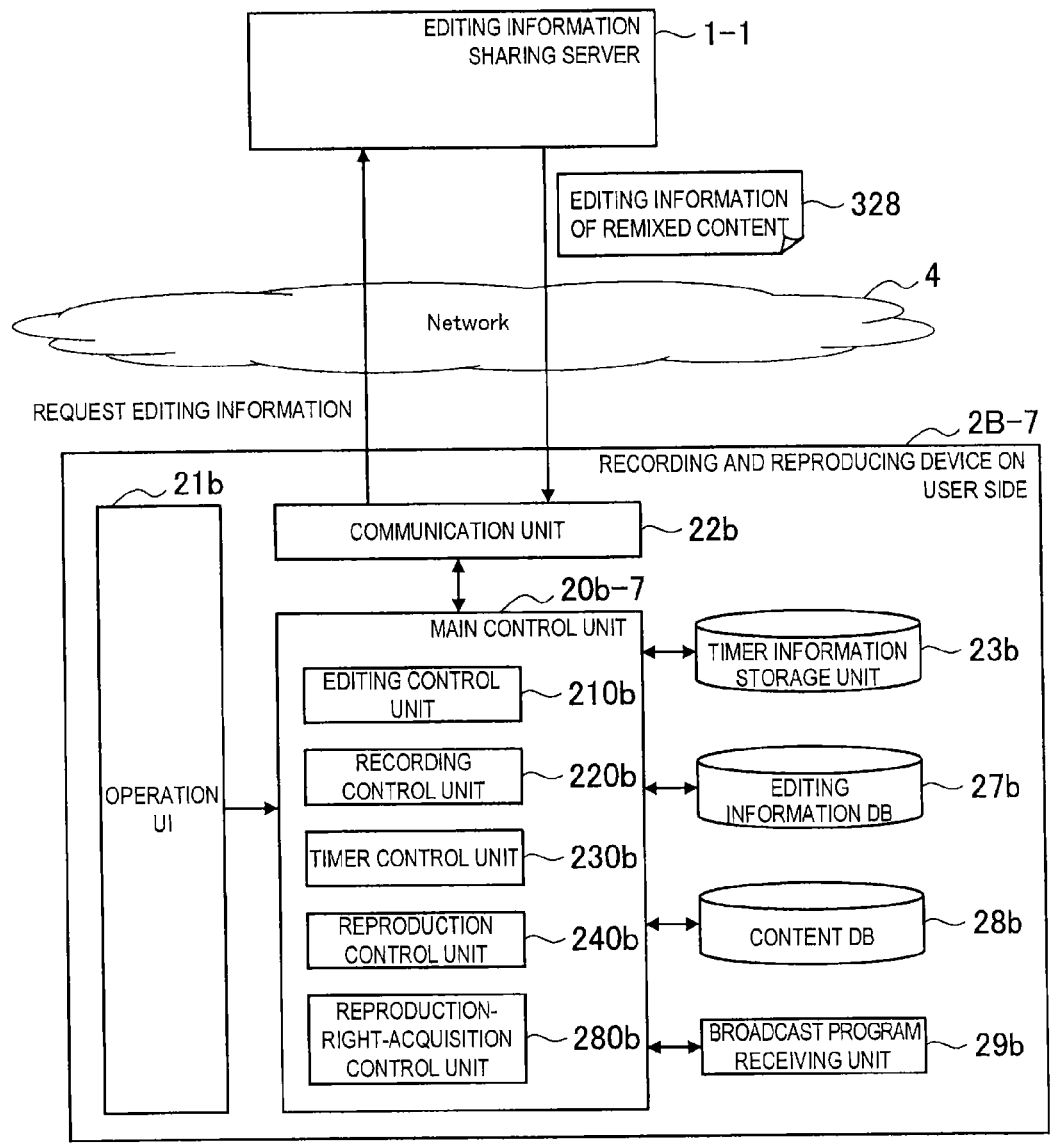
FIG. 17 is a block diagram showing main configurations of an editing information sharing system according to a seventh embodiment.
Figure 18:
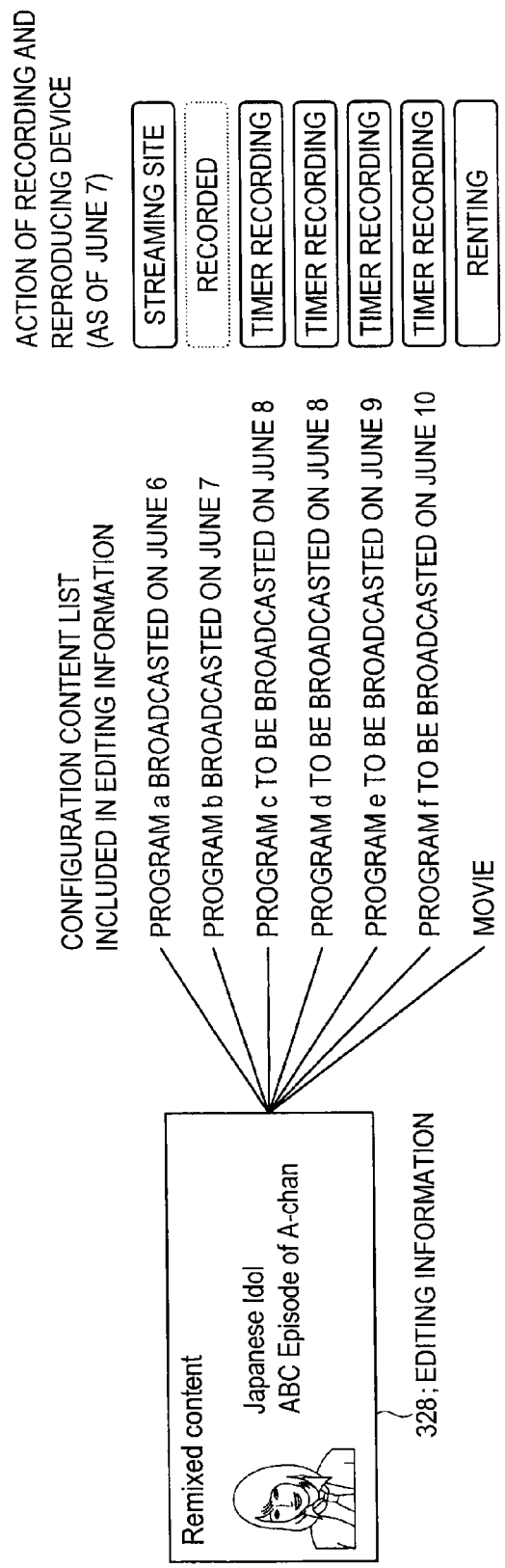
FIG. 18 is a diagram illustrating reproduction right acquisition control according to the seventh embodiment.

Next, with reference to FIGS. 17 to 18, the seventh embodiment according to the present disclosure is explained. According to the present embodiment, acquisition of a configuration content list (content on which editing information depends) included in the editing information of remixed content can be controlled in the recording and reproducing device 2B in the user side.

FIG. 17 is a block diagram showing main configurations of an editing information sharing system according to the seventh embodiment. As shown in FIG. 17, a recording and reproducing device 2B-7 on a user side, and an editing information sharing server 1-1 are connected via a network 4 in the editing information sharing system according to the seventh embodiment. To the editing information sharing server 1, a recording and reproducing device 2A on a provider side transmits editing information. However, the recording and reproducing device 2A on the provider side is not shown here.

Configurations of the editing information sharing server 1-1 are similar to the first embodiment. Accordingly, repeated explanation is omitted.

As shown in FIG. 17, the recording and reproducing device 2B-7 on the provider side includes a main control unit 20b-7, an operation UI 121b, a communication unit 22b, an editing information DB 27b, a content DB 28b, a broadcast program receiving unit 29b, and a timer information storage unit 23b. The operation UI 21b, the communication unit 22b, the editing information DB 27b, the content DB 28b, the broadcast program receiving unit 29b, and the timer information storage unit 23b are similar to the configurations explained using the same reference signs with reference to FIG. 2.

The main control unit 20b-7 functions as an editing control unit 210b, a recording control unit 220b, a timer control unit 230b, a reproduction control unit 240b, and a reproduction-right-acquisition control unit 280b. The editing control unit 210b, the recording control unit 220b, the recording control unit 230b, and the reproduction control unit 240b are similar to the configurations explained using the same reference signs with reference to FIG. 2.

The reproduction-right-acquisition control unit 280b acquires a reproduction right of content included in the editing information 326 on the basis of the editing information 328 of the remixed content acquired from the editing information sharing server 1-1 in response to the request for the editing information. Here, as an example, the editing information 328 indicates details of the editing of the remixed content generated by editing pieces of content. Hereinafter, with reference to FIG. 18, control of the acquisition of the reproduction right is specifically explained.

FIG. 18 is a diagram illustrating reproduction-right-acquisition control according to the seventh embodiment. As shown in FIG. 18, the editing information 326 is a remixed content generated by editing the pieces of content, and the reproduction-right-acquisition control unit 280b controls the acquisition of reproduction right of each piece of content in accordance with the configuration content list.

As shown in FIG. 18, the configuration content list included in the editing information 328 includes broadcasted programs and programs to be broadcasted. Note that, information on each program included in the configuration content list may be acquired with reference to the electronic program guide, or may be included in the editing information 328.

For example, as shown in FIG. 18, in a case where the editing information 328 is acquired as of June 7, a program a and a program b have already been broadcasted on June 6 and June 7, respectively. Here, in a case where the program b on June 7 has been recorded in advance and stored in the content DB 28b, it can be said that a reproduction right has been duly acquired. On the other hand, since the program a has already been broadcasted but has not been recorded, a reproduction right has not been acquired. In this case, the reproduction-right-acquisition control unit 280b searches for a streaming site capable of duly viewing the program a, causes the program a to be streamed, and achieves acquisition of the reproduction right.

Programs c to f are programs to be broadcasted after June 8. Accordingly, the reproduction-right-acquisition control unit 280b instructs the timer control unit 230b to set a timer to record these programs. Accordingly, the reproduction-right-acquisition control unit 280b achieves acquisition of the reproduction rights when the programs c to f are broadcasted. Note that, the configuration content list may include an unbroadcast program because broadcast time of a program differs between areas, or because details of the unbroadcast program can be recognized from information on the program in advance and the unbroadcast program can be a target for editing.

In a case of movie content included in the configuration content list, acquisition of a reproduction right can be achieved by searching for web site capable of duly renting the movie content and making possible to perform rental reproduction.

As described above, according to the seventh embodiment, the reproduction-right-acquisition control unit 280b can achieve acquisition of a reproduction right of each piece of content in accordance with the configuration content list included in the editing information of the remixed content. After the reproduction right of each piece of content is acquired, the editing control unit 210b edits each piece of content, and the reproduction control unit 240b reproduces editing information (reproduces the remixed content edited on the basis of the editing information). In a case of the configuration content list shown in FIG. 18, content is edited on the basis of the editing information 328 when reproduction rights of all pieces of content have been collected after the program f to be broadcasted on June 10 has been recorded.

2-8. Eighth Embodiment

Figure 19:
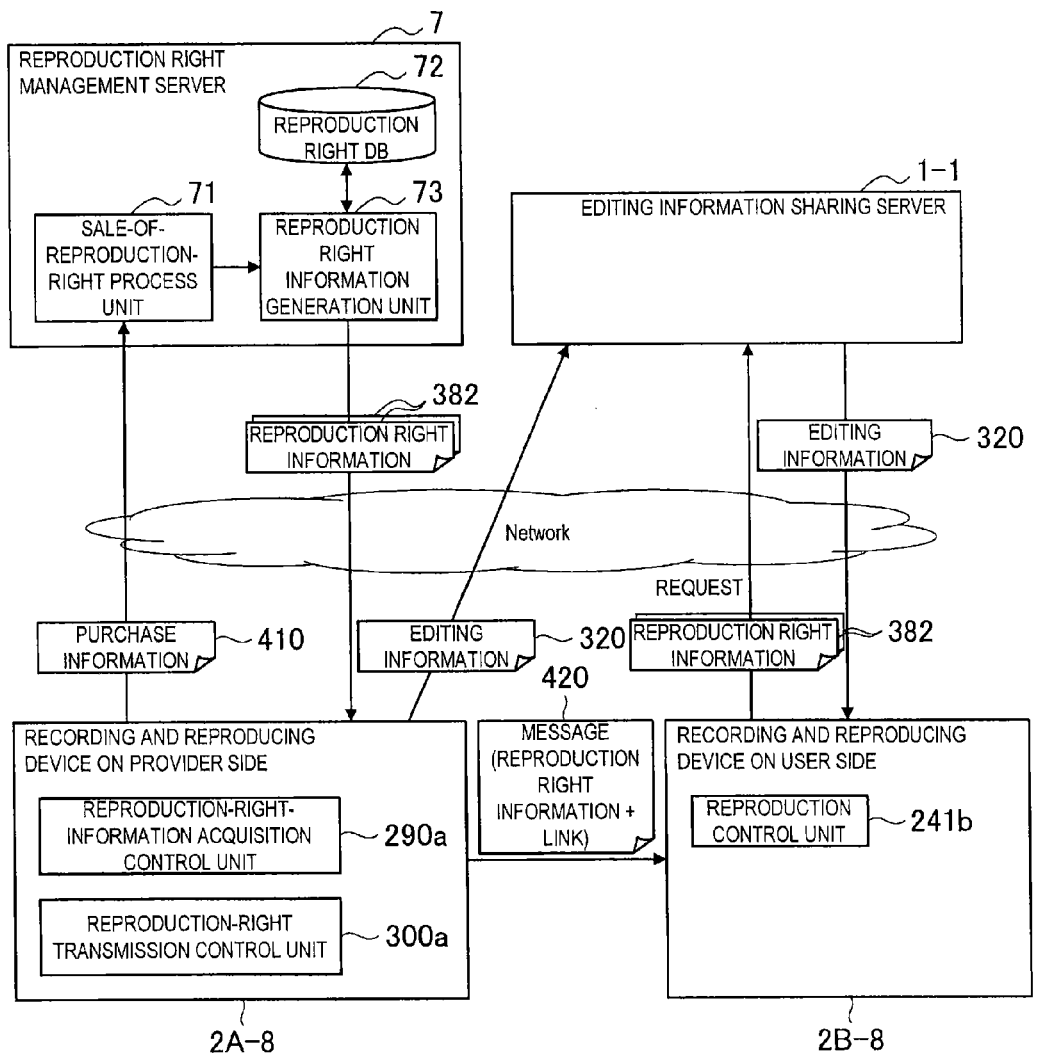
FIG. 19 is a block diagram showing main configurations of an editing information sharing system according to an eighth embodiment.
Figure 20:
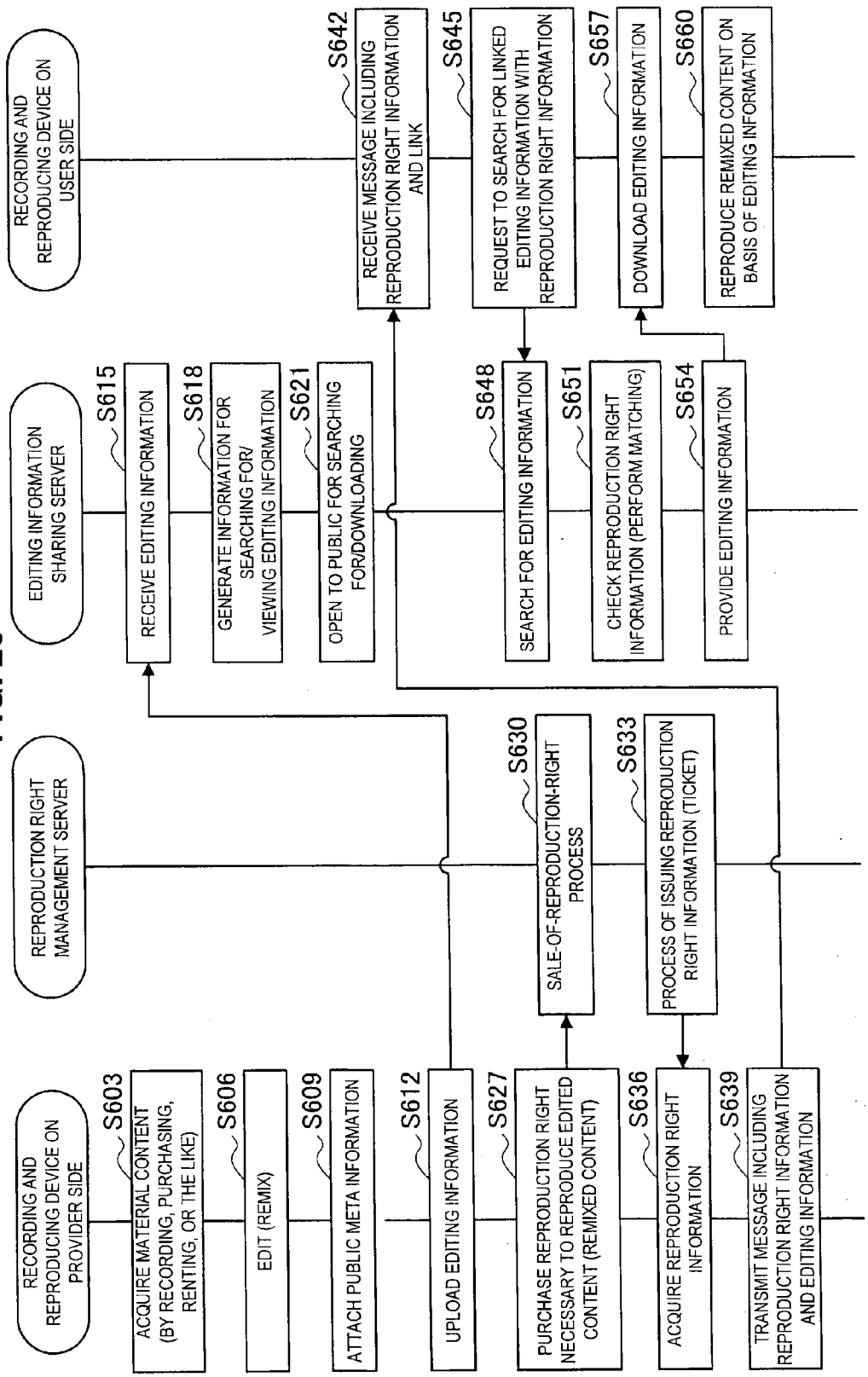
FIG. 20 is a sequence diagram showing an operation process in an editing information sharing system according to the eighth embodiment.

Next, with reference to FIGS. 19 to 20, the eighth embodiment according to the present disclosure is explained. According to the present embodiment, a provider side can purchase a reproduction right of content on which editing information depends, and the reproduction right can be transmitted to a user side together with a link to the editing information.

(2-8-1. Configuration)

FIG. 19 is a block diagram showing main configurations of an editing information sharing system according to the eighth embodiment. As shown in FIG. 19, a recording and reproducing device 2A-8 on a provider side, a reproduction right management server 7, an editing information sharing server 1-1, and a recording and reproducing device 2B-8 on a user side are connected via a network 4 in the editing information sharing system according to the eighth embodiment. Configurations of the editing information sharing server 1-1 are similar to the first embodiment. Accordingly, repeated explanation is omitted. With regard to the recording and reproducing device 2A-8 on the provider side and the recording and reproducing device 2B-8 on the user side, only main functional configurations of main control units 20a and 20b are shown.

Specifically, the recording and reproducing device 2A-8 on the provider side includes a reproduction-right-information acquisition control unit 290a and a reproduction-right transmission control unit 300a. The reproduction-right-information acquisition control unit 290a performs control to purchase (acquire) a reproduction right of content used for editing so as to handover the reproduction right. Specifically, the reproduction-right-information acquisition control unit 290a transmits, to the reproduction right management server 7, purchase information 410 indicating an intention of purchase and content to be purchased. Accordingly, the recording and reproducing device 2A-8 on the provider side can acquire the reproduction right (reproduction right information 382).

The reproduction-right transmission control unit 300a performs control in a manner that a message 420 including the reproduction right information 382 acquired from the reproduction right management server 7 and link information to the editing information 320 transmitted to the editing information sharing server 1-1 is transmitted to the recording and reproducing device 2B-8 on the user side that is a handover destination.

The reproduction right management server 7 includes a sale-of-reproduction-right process unit 71, a reproduction right DB 72, and a reproduction right information generation unit 73. In accordance with the purchase information 410 transmitted from the recording and reproducing device 2A-8 on the provider side, the sale-of-reproduction-right process unit 71 instructs the reproduction right information generation unit 73 to generate reproduction right information for sale and to transmit the generated reproduction right information to the recording and reproducing device 2A-8 on the provider side.

The reproduction right DB 72 is a storage unit for storing reproduction rights of various content. Specifically, information necessary to sell the reproduction rights of the various content is stored.

In response to the instruction from sale-of-reproduction-right process unit 71, the reproduction right information generation unit 73 generates the reproduction right information for handover on the basis of a reproduction right of target content stored in the reproduction right DB 72. The reproduction right information for handover is a so-called reproduction ticket of content. For example, expire date, reproduction times, reproduction device, or details of editing may be limited.

On the basis of the message 420 received from the recording and reproducing device 2A-8 on the provider side, the recording and reproducing device 2B-8 on the user side transmits the reproduction right information 382 and a request for searching for the linked editing information to the editing information sharing server 1-1. In addition, the recording and reproducing device 2B-8 on the user side collects content that the reproduction right information 382 allows to reproduce, from among a web site for selling/renting content.

When the editing information sharing server 1-1 returns the editing information 320 to the recording and reproducing device 2B-8 on the user side, the reproduction control unit 241b reproduces the editing information 320. Specifically, the reproduction control unit 241b performs control in a manner that the content (configuration content) on which the received editing information 320 depends is reproduced after being edited in accordance with the editing information 320.

(2-8-2. Operation Process)

Next, with reference to FIG. 20, an operation process according to the eighth embodiment is explained. FIG. 20 is a sequence diagram showing an operation process in the editing information sharing system according to the eighth embodiment. As shown in FIG. 20, first in Steps S603 to 609, the recording and reproducing device 2A-8 on the provider side edits the acquired material content and attaches public meta information to editing information indicating details of editing.

Next, in Step S612, the recording and reproducing device 2A-8 on the provider side transmits the editing information to the editing information sharing server 1-1.

Subsequently, in Steps S615 to S621, the editing information sharing server 1-1 receives the editing information, generates the information for searching for/viewing the editing information on the basis of the received editing information, and opens the editing information to the public for searching for/downloading the editing information.

Subsequently, in Step S627, procedure for purchasing a reproduction right necessary to reproduce the edited content (remixed content) is performed on the reproduction right management server 7. Specifically, the reproduction-right-information acquisition control unit 290a transmits, to the reproduction right management server 7, purchase information 410 indicating an intention of purchase and content to be purchased.

Next, in Step S630, in accordance with the received purchase information 410, the sale-of-reproduction-right process unit 71 of the reproduction right management server 7 instructs the reproduction right information generation unit 73 to generate reproduction right information for sale and to transmits the generated reproduction right information to the recording and reproducing device 2A-8 on the provider side.

Next, in Step S633, the reproduction right information generation unit 73 of the reproduction right management server 7 issues, to the recording and reproducing device 2A-8 on the provider side, the reproduction right information (reproduction ticket) generated in accordance with the instruction from the sale-of-reproduction-right process unit 71.

Subsequently, in Step S636, the recording and reproducing device 2A-8 on the provider side acquires the reproduction right information. In the next Step S639, the recording and reproducing device 2A-8 on the provider side transmits, to the recording and reproducing device 2B-8 on the user side, a message including reproduction right information and a link of the editing information.

Next, in Step S642, the recording and reproducing devices 2B-7 on the user side receives the message 420 including the reproduction right information and the link.

Subsequently, in Step S645, the recording and reproducing device 2B-8 on the user side requests the editing information sharing server 1-1 to search for the linked editing information with the reproduction right information on the basis of the message 420.

Next, in Steps S648 to S654, the editing information sharing server 1-1 searches for the target editing information in response to the request from the recording and reproducing device 2B-8 on the user side, and determines whether the requestor owns a reproduction right of content necessary to reproduce the searched editing information. Specifically, since the reproduction right information is transmitted together with the request for searching according to the present embodiment, the editing information sharing server 1-1 performs matching of the reproduction right information and content constituting the searched editing information (of the requested target).

Subsequently, in Step S654, the editing information sharing server 1-1 transmits the searched editing information (of the requested target) to the recording and reproducing device 2B-8 on the user side after confirming that the requestor owns the reproduction right.

Next, in Step S657, the recording and reproducing device 2B-8 on the user side receives (downloads) the editing information from the editing information sharing server 1-7. In Step S660, the recording and reproducing device 2B-8 on the user side reproduces content edited on the basis of the received editing information. According to the eighth embodiment as described above, it is possible to purchase a reproduction right necessary to reproduce remixed content edited by himself/herself, and hand over the reproduction right to an acquaintance or the like. Accordingly, a recording and reproducing device 2B-8 on the user side used by the acquaintance or the like can reproduce the remixed content edited by a provider, while substance of the content is not transmitted/received.

<<3. Conclusion>>

As described above, it is possible for the editing information sharing system according to embodiments of the present disclosure to share editing information and manages a reproduction right of content by controlling transmission of the editing information in accordance with presence or absence of the right to reproduce content.

It should be understood by those skilled in the art that various modifications, combinations, sub-combinations and alterations may occur depending on design requirements and other factors insofar as they are within the scope of the appended claims or the equivalents thereof.

For example, it is also possible to create a computer program for causing a hardware such as CPU, ROM, and RAM, which are embedded in the recording and reproducing device 2A on the provider side, the recording and reproducing device 2B on the user side, or the editing information sharing server 1, to execute functions of the recording and reproducing device 2A on the provider side, the recording and reproducing device 2B on the user side, or the editing information sharing server 1. Moreover, it may be possible to provide a computer-readable recording medium having the computer program stored therein.

Furthermore, the advantages discussed in this specification are only intended for illustrative and exemplary purposes and are not limitative. In other words, in addition to or in place of the above-described advantages, the technology according to the embodiments of the present disclosure may exhibit other advantages that are obvious to a skilled person from the specification.

Additionally, the present technology may also be configured as below.

(1) An information processing device including:
a communication unit configured to receive editing information of content data;
an accumulation unit configured to accumulate the editing information; and
a control unit configured to control whether to return the editing information to an external device in accordance with a right to use content corresponding to a requestor's identification information included in request information for requesting the editing information, the request information being received from the external device via the communication unit.

(2) The information processing device according to (1),
wherein the control unit converts a format of the editing information in accordance with equipment information of the external device received via the communication unit.

(3) The information processing device according to (1) or (2),
wherein, in response to a request for editing information received from at least one external device via the communication unit, the control unit generates pieces of editing information corresponding to respective external devices and performs control in a manner that the pieces of editing information is transmitted to the plurality of external devices.

(4) The information processing device according to any one of (1) to (3),
wherein the communication unit receives a storage region of remixed content formed by a client device using pieces of content, and identification information of the pieces of used content, and
wherein the control unit performs control in a manner that link information indicating the storage region of the remixed content to which a right to use the pieces of content is attached is returned to the external device in response to a reproduction request of the remixed content received via the communication unit from the external device having the right to use the pieces of content.

(5) The information processing device according to any one of (1) to (4),
wherein the communication unit receives a playlist including identification information of content as editing information from a client device, and
wherein the control unit controls whether to return the playlist to an external device via the communication unit in accordance with a right to use content corresponding to a requestor's identification information included in request information for requesting the playlist, the request information being received from the external device via the communication unit.

(6) An information processing device including:
a communication unit configured to transmit request information for requesting editing information corresponding to specific content data to a server device;
a storage unit configured to store a right to use content data; and
a control unit configured to perform control in a manner that content data referred to by the editing information corresponding to the request information received via the communication unit is reproduced by using the editing information, in accordance with whether the storage unit stores the right to use the content data.

(7) The information processing device according to (6),
wherein the control unit automatically generates an optimal viewing schedule of playlists as the editing information.

(8) The information processing device according to (6),
wherein the control unit performs control to request the editing information from the server device, the control being triggered by input of evaluation to a posted article of the editing information provided from the server device to a social network server.

(9) The information processing device according to any one of (6) to (8),
wherein the control unit schedules action for acquiring a right to use content of content data to which the right to use the content is not attached, from content data referred to by desired editing information.

(10) The information processing device according to any one of (6) to (9),
wherein, via the communication unit,
a right to use content that is necessary to use predetermined editing information is acquired from a reproduction right management server, and
the right to use the content is transmitted to a specific client device together with a link to the predetermined editing information.

(11) A control method including:
receiving editing information of content data;
accumulating the editing information; and
controlling whether to return the editing information to an external device in accordance with a right to use content corresponding to a requestor's identification information included in request information for requesting the editing information, the request information being received from the external device.

(12) A non-transitory computer-readable storage medium having a program stored therein, the program causing a computer to function as:
a communication unit configured to transmit request information for requesting editing information corresponding to specific content data to a server device;
a storage unit configured to store a right to use content data; and
a control unit configured to perform control in a manner that content data referred to by the editing information corresponding to the request information received via the communication unit is reproduced by using the editing information, in accordance with whether the storage unit stores the right to use the content data.

What is claimed is:
1. An information processing device connected to a first external device and a plurality of second external devices being respectively different from the first external device via a communication network, the information processing device comprising:
circuitry configured to:
receive editing information of content data from the first external device via the communication network, the editing information indicating modification of the content data;
store the editing information in a storage of the information processing device;

receive a request for the editing information from one of the second external devices via the communication network, the request including information indicating that a user of the one of the second external devices owns a right to use the content data;

convert the editing information in accordance with cooperation information received from the one of the second external devices, the cooperation information indicating cooperation between the one of the second external devices and at least another one of the second external devices; and determine, in response to the request received from the one of the second external devices, whether to transmit the editing information to the one of the second external devices in accordance with the information indicating that the user of the one of the second external devices owns the right to use the content data, wherein when the user of the one of the second external devices owns the right to use the content data, the circuit transmits the converted editing information to the one of the second external devices via the communication network.

2. The information processing device according to claim 1, wherein the circuitry converts the editing information in accordance with equipment information of the one of the second external devices, the equipment information received from the one of the second external devices via the communication network.

3. The information processing device according to claim 1, wherein the circuitry receives a storage region of remix content formed by the first external device using pieces of the content data, and identification information of the pieces of the content data from the first external device via the communication network, the circuitry receives a reproduction request of the remixed content from the one of the second external devices having the right to use the pieces of the content data, and the circuitry returns link information to the one of the second external devices in response to the reproduction request of the remixed content via the communication network, the link information indicating the storage region of the remixed content to which the right to use the pieces of content data is attached.

4. The information processing device according to claim 1, wherein the circuitry receives a playlist including identification information of the content data as editing information from the one of the second external devices via the communication network, and the circuitry determines whether to transmit the playlist to the one of the second external devices via the communication network in accordance with the right to use the content data.

5. The information processing device according to claim 1, wherein the editing information includes at least one of a reproduction time, a reproduction start or stop position, information of inserting a title or a caption, and information of adding a second program channel.

6. The information processing device according to claim 1, wherein the circuitry is further configured to:

generate catalog information for searching for and viewing the editing information from the storage, the catalog information including a keyword for the searching and a thumbnail for the viewing; and search for, according to the request received from the one of the second external devices, the editing information from the storage by using the keyword and the thumbnail of the catalog information.

7. An information processing device connected to a server device via a communication network, the information processing device comprising:

circuitry configured to:

store a right to use content data in a storage of the information processing device;

transmit a request for editing information corresponding to the content data to the server device via the communication network, the request including information indicating that a user of the information processing device owns the right to use the content data, and the editing information indicating modification of the content data;

transmit cooperation information of the information processing device to the server device, the cooperation between the information indicating cooperation between the information processing device and at least one of a plurality of external devices being respectively different from the information processing device;

receive the editing information from the server device via the communication network in response to the request, the editing information being converted by the server device in accordance with the cooperation information; and edit the content data according to the editing information received from the server device, in accordance with the information indicating that the circuitry owns the right to use the content data, wherein when the circuitry owns the right to use the content data, the circuitry edits the content data according to the editing information received from the server device via the communication network.

8. The information processing device according to claim 7, wherein the circuitry automatically generates an optimal viewing schedule of playlists as the editing information.

9. The information processing device according to claim 7, wherein the circuitry performs control to request the editing information from the server device, the control being triggered by input of evaluation to a posted article of the editing information provided from the server device to a social network server.

10. The information processing device according to claim 7, wherein the circuitry acquires a right to use the content data when the right to use the content data is not stored in the storage.

11. The information processing device according to claim 7, wherein the circuitry is configured to:

acquire a right to use content that is necessary to use predetermined editing information from a reproduction right management server via the communication network, and transmit the right to use the content to a specific client device together with a link to the predetermined editing information via the communication network.

12. The information processing device according to claim 7, wherein the editing information includes at least one of a reproduction time, a reproduction start or stop position, information of inserting a title or a caption, and information of adding a second program channel.

13. A control method performed by an information processing device connected to a first external device and a plurality of second external devices being respectively different from the first external device via a communication network, the control method comprising:
- receiving, by circuitry of the information processing device, editing information of content data from the first external device via the communication network, the editing information indicating modification of the content data;
- storing, by the circuitry, the editing information in a storage of the information processing device;
- receiving, by the circuitry, a request for the editing information from one of the plurality of the second external devices via the communication network, the request including information indicating that a user of the one of the second external devices owns a right to use the content data;
- converting, by the circuitry, the editing information in accordance with cooperation information received from the one of the second external devices, the cooperation information indicating cooperation between the one of the second external devices and at least another one of the second external devices; and
- determining, by the circuitry in response to the request received from the one of the second external devices, whether to transmit the editing information to the second external device in accordance with the information indicating that the user of the one of the second external devices owns the right to use the content data, wherein
- when the user of the one of the second external devices owns the right to use the content data, the circuitry transmits the converted editing information to the one of the second external devices via the communication network.

14. The control method according to claim 13, wherein the editing information includes at least one of a reproduction time, a reproduction start or stop position, information of inserting a title or a caption, and information of adding a second program channel.

15. The control method according to claim 13, further comprising:
- generating, by the circuitry, catalog information for searching for and viewing the editing information from the storage, the catalog information including a keyword for the searching and a thumbnail for the viewing; and
- searching for, by the circuitry according to the request received from the second external device, the editing information from the storage by using the keyword and the thumbnail of the catalog information.

16. A non-transitory computer-readable storage medium including a program stored therein, which when executed by an information processing device including circuitry and connected to a server device via a communication network, causes the circuitry to:
- store a right to use content data in a storage of the information processing device;
- transmit a request for editing information corresponding to the content data to the server device via the communication network, the request including information indicating that a user of the information processing device owns the right to use the content data;
- transmit cooperation information of the information processing device to the server device, the cooperation information indicating cooperation between the information processing device and at least one of a plurality of external devices being respectively different from the information processing device;
- receive the editing information from the server device via the communication network in response to the request, the editing information being converted by the server device in accordance with the cooperation information; and
- edit the content data according to the editing information received from the server device, in accordance with the information indicating that the circuitry owns the right to use the content data, wherein
- when the circuitry owns the right to use the content data, the circuitry edits the content data according to the editing information received from the server device via the communication network.

17. The non-transitory computer-readable storage medium according to claim 16, wherein the editing information includes at least one of a reproduction time, a reproduction start or stop position, information of inserting a title or a caption, and information of adding a second program channel.

* * * * *